United States Patent
Ellis

(10) Patent No.: US 7,729,983 B1
(45) Date of Patent: Jun. 1, 2010

(54) CREDIT RISK MANAGING LOAN POOLS

(75) Inventor: Margaret Sue Ellis, Denver, CO (US)

(73) Assignee: Clayton Fixed Income Services Inc., Shelton, CT (US)

( * ) Notice: Subject to any disclaimer, the term of this patent is extended or adjusted under 35 U.S.C. 154(b) by 0 days.

(21) Appl. No.: 11/871,431

(22) Filed: Oct. 12, 2007

Related U.S. Application Data

(62) Division of application No. 09/992,348, filed on Nov. 21, 2001.

(51) Int. Cl.
    *G06Q 40/00* (2006.01)
(52) U.S. Cl. .............................. 705/38; 705/35; 705/36; 705/37; 705/45
(58) Field of Classification Search ............. 705/35–45; 707/E17.02, E17.014, E17.018, E17.044; 715/8
    See application file for complete search history.

(56) References Cited

U.S. PATENT DOCUMENTS

| | | | |
|---|---|---|---|
| 5,699,527 | A | 12/1997 | Davidson |
| 5,930,775 | A | 7/1999 | McCauley et al. |
| 6,321,212 | B1 | 11/2001 | Lange |
| 6,401,070 | B1 | 6/2002 | McManus et al. |
| 6,654,727 | B2 | 11/2003 | Tilton |
| 6,684,196 | B1 | 1/2004 | Mini et al. |
| 7,062,458 | B2 | 6/2006 | Maggioncalda et al. |
| 2001/0029482 | A1 | 10/2001 | Tealdi et al. |
| 2001/0042034 | A1 | 11/2001 | Elliott |
| 2001/0044773 | A1 | 11/2001 | Sellers |
| 2001/0054022 | A1 | 12/2001 | Louie et al. |
| 2002/0007342 | A1 | 1/2002 | Sellers et al. |
| 2002/0035520 | A1 | 3/2002 | Weiss |
| 2002/0052820 | A1 | 5/2002 | Gatto |
| 2002/0059136 | A1 | 5/2002 | May |
| 2003/0018558 | A1 | 1/2003 | Heffner et al. |
| 2003/0074306 | A1 | 4/2003 | Rios et al. |
| 2003/0130933 | A1 | 7/2003 | Huang et al. |
| 2007/0043654 | A1* | 2/2007 | Libman ....................... 705/38 |

OTHER PUBLICATIONS

Richard Cantor; Probability of Default Ratings and Loss Given Default Assesssments for Non-Financial Speculative-Grade corporate Obligors in the United States and Canada; Aug. 2006; Moody; 1-16.*

Co-op Financial Service Staff, ATM Processing Brochure, Co-op, web, pp. 1-2.

(Continued)

*Primary Examiner*—James P Trammell
*Assistant Examiner*—Marissa Liu
(74) *Attorney, Agent, or Firm*—Dorsey & Whitney LLP

(57) ABSTRACT

A system providing a comprehensive tool useful in credit risk managing a set of loans. The system includes a method for obtaining an estimated financial outcome, i.e., a gain or a loss, for a particular loan, and applying the estimated loss for to the set. The system also includes a method for obtaining a probability of a loss for a particular loan, and applying the probability of loss to the set. The system further includes the generation of a list of loans from the set of loans with a heightened risk of loss.

18 Claims, 16 Drawing Sheets

OTHER PUBLICATIONS

Notice of Allowance and PTO-892, U.S. Appl. No. 09/992,348, Nov. 16, 2009, 6 pages.
Non-Final Office Action and PTO-892, U.S. Appl. No. 11/871,483, Nov. 18, 2009, 12 pages.
Final Office Action and PTO-892, U.S. Appl. No. 09/991,762, Dec. 8, 2009, 12 pages.
Final Office Action and PTO-892, U.S. Appl. No. 11/871,316, Nov. 9, 2009, 13 pages.
Amendment and Response to Final Office Action, U.S. Appl. No. 11/871,316, Jan. 11, 2010, 7 pages.
Non-Final Office Action and PTO-892, U.S. Appl. No. 11/871,346, Nov. 30, 2009, 8 pages.
Restriction Requirement, U.S. Appl. No. 09/991,762, Jan. 9, 2007, 6 pages.
Amendment and Response to Restriction Requirement, U.S. Appl. No. 09/991,762, Mar. 7, 2007, 18 pages.
Non-Final Office Action and PTO-892, U.S. Appl. No. 09/991,762, May 21, 2007, 10 pages.
Terminal Disclaimer, U.S. Appl. No. 09/991,762, Sep. 5, 2007, 1 page.
Response to Office Action, U.S. Appl. No. 09/991,762, Sep. 5, 2007, 3 pages.
Non-Final Office Action and PTO-892, U.S. Appl. No. 09/991,762, Nov. 28, 2007, 14 pages.
Terminal Disclaimer, U.S. Appl. No. 09/991,762, May 28, 2008, 1 page.
Amendment and Response to Office Action, U.S. Appl. No. 09/991,762, May 28, 2008, 13 pages.
Final Office Action and PTO-892, U.S. Appl. No. 09/991,762, Aug. 22, 2008, 14 pages.
Amendment and Response to Final Office Action, U.S. Appl. No. 09/991,762, Feb. 23, 2009, 14 pages.
Non-Final Office Action, U.S. Appl. No. 09/991,762, Mar. 16, 2009, 14 pages.
Amendment and Response to Non-Final Office Action, U.S. Appl. No. 09/991,762, Aug. 17, 2009, 13 pages.
Restriction Requirement, U.S. Appl. No. 09/992,348, Jan. 22, 2007, 6 pages.
Amendment and Response to Restriction Requirement, U.S. Appl. No. 09/992,348, Feb. 21, 2007, 12 pages.
Non-Final Office Action and PTO-892, U.S. Appl. No. 09/992,348, May 23, 2007, 16 pages.
Response to Office Action, U.S. Appl. No. 09/992,348, Sep. 5, 2007, 5 pages.
Final Office Action, U.S. Appl. No. 09/992,348, Nov. 16, 2007, 17 pages.
Amendment and Response to Office Action, U.S. Appl. No. 09/992,348, Mar. 17, 2008, 12 pages.
Non-Final Office Action and PTO-892, U.S. Appl. No. 09/992,348, May 7, 2008, 18 pages.
Amendment and Response to Office Action, U.S. Appl. No. 09/992,348, Nov. 24, 2008, 15 pages.
Final Office Action, U.S. Appl. No. 09/992,348, Feb. 11, 2009, 17 pages.
Amendment and Response to Final Office Action, U.S. Appl. No. 09/992,348, Aug. 11, 2009, 17 pages.
Non-Final Office Action, U.S. Appl. No. 11/871,316, Dec. 30, 2008, 11 pages.
Amendment and Response to Non-Final Office Action, U.S. Appl. No. 11/871,316, Jun. 26, 2009, 11 pages.
Terminal Disclaimer, U.S. Appl. No. 11/871,316, Jun. 26, 2009, 1 page.
Non-Final Office Action and PTO-892, U.S. Appl. No. 11/871,483, Jul. 23, 2008, 10 pages.
Amendment and Response to Non-Final Office Action, U.S. Appl. No. 11/871,483, Nov. 24, 2008, 5 pages.
Final Office Action and PTO-892, U.S. Appl. No. 11/871,483, Feb. 26, 2009, 11 pages.
Amendment and Response to Final Office Action, U.S. Appl. No. 11/871,483, Aug. 26, 2009, 6 pages.
Non-Final Office Action and PTO-892, U.S. Appl. No. 11/871,548, May 28, 2008, 11 pages.
Amendment and Response to Non-Final Office Action, U.S. Appl. No. 11/871,548, Nov. 26, 2008, 7 pages.
Final Office Action and PTO-892, U.S. Appl. No. 11/871,548, Mar. 18, 2009, 12 pages.

* cited by examiner

| Loan Information: | | | Last Updated: MO/DAY/YEAR 4:1:25 PM | |
|---|---|---|---|---|
| Portfolio: | TIAA | Bond Name: | 1 | |
| Origination: | 999 | Address: | 123 E Pacific Pkwy Dr So Denver CO 80202 | |
| Borrower Name: | John_Doe | | | |
| Borrower Number: | 10 | | | |
| Servicer: | XYZ | Originator: | ABC | |
| Watch List: | ☑ | | | |
| | | Status Code: | 30 | |
| | | Default Reason: | Bankruptcy | |
| | ☐ Servicer Error | ☑ MI Error | ☑ Payment Plan | ☐ BK |

| Origination Information: | | | |
|---|---|---|---|
| Origination Date: | 1/1/1999 | Property Type: | SINGLE FAMILY ATTACH |
| Mortgage Term: | 10 | Occupancy: | Investment |
| Original Amount: | 150000 | Product Type: | Aro |
| Appraisal Value: | 265000 | Purpose: | Construction Permanent |
| Orig P and t: | 2 | Documentation: | Full |
| LTV: | 0 | PMI Code: | Y8 |
| FICO: | 12 | As of Date: | 1/1/2001 |
| Original Rate: | 9.7 | Lien: | 1 |
| 1st Pymt. Dt.: | 1/12/1996 | | |

| Current Information: | | | |
|---|---|---|---|
| Current Balance: | 1000 | Our int. Rate: | 10 |
| Valuation: | Appraisal | Sch P and t: | 2336.23 |
| Current Value: | 456214 | Valuation Date: | 5/14/1999 |
| Last Int Paid Dt: | 11/12/1999 | Delinquency: | 999 |
| Est. Loss: | -12691 | Default Probability: | 25 |
| Est. Severity: | 0 | MI: ☑ | |
| Cart: | B | MI Company: | Mortgage Comp 1 |
| Coverage: | 8 | | |

[ Save Changes ] [ Cancel ]

FIG.2

| LOAN NUMBER | FIRST PAYMENT DATE | PAID TO DATE | STATE | ZIP | CURRENT VALUATION METHOD | ORIGINAL APPRAISAL CURRENT VALUE | ORIGINAL AMOUNT CURRENT BALANCE | ORIGINAL LTV CURRENT LTV | ESTIMATED (LOSS) OR GAIN ESTIMATED SEVERITY | ESTIMATED LIQUIDATION DATE | DELINQUENCY HISTORY |
|---|---|---|---|---|---|---|---|---|---|---|---|
| 0000091700 | 1/1/98 | 6/1/98 | CO | 80465 | SALES PRICE 2/25/00 | $334,000 $393,000 | $317000 $0 | 95.0 00 | $406,701 -128.81% | 3/1/00 | C36F999FFEFRR0 |
| 0007658917 | 1/1/98 | 6/1/98 | FL | 33138 | BPO- 4/4/00 | $301,000 $565,000 | $240,800 $239,774 | 80.0 42.4 | 169,227 -70.28% | 6/1/01 | C36F1999999999999999F |
| 0007659428 | 2/1/98 | 9/1/99 | OR | 97007 | APPRAISAL 1/12/00 | $343,000 $349,000 | $274,400 $270,034 | 80.0 77.2 | ($8,716) 3.18% | 1/1/01 | CCCCCCCCC36FFFFF |
| 0031358799 | 2/1/98 | 6/1/99 | CA | 91423 | INTERNAL ESTIMATE | $370,000 $365,737 | $296,000 $292,609 | 80.0 80.0 | ($48,028) 16.23% | 9/1/01 | XXXXXXCC36CC69FFFF999 BK |

FIG.4

CREDIT RISK MANAGING LOAN POOLS

REFERENCE TO RELATED APPLICATIONS

This application is a divisional of and claims priority to co-pending application Ser. No. 09/992,348 titled "Credit Risk Managing Loan Pools" filed on Nov. 21, 2001, which is related to co-pending commonly assigned application Ser. No. 09/991,762 titled "Analyzing Investment Data" filed on Nov. 21, 2001, both of which are hereby incorporated by reference in their entirety.

FIELD OF THE INVENTION

The present invention relates to credit risk managing loan pools. In particular, the present invention provides methods useful for credit risk managing loan pools and investing in loan pools including a method for generating a loss list, for estimating a loss for a loan, and for determining a probability of loss for a loan. The present invention also provides a system or apparatus incorporating all or some of the methods, and providing a comprehensive credit risk management tool.

BACKGROUND

Most home buyers and buyers of other types of property, such as automobiles, boats, intangible assets, and the like, obtain a loan from a mortgage loanee or other lender for some or all of the purchase price for the property. Referring particularly to mortgage loans, oftentimes the mortgage loanee sells the mortgage loan to a mortgage loan purchaser after the buyer closes on the purchase. In return for the sale of the mortgage loan, the mortgage loanee receives a fee from the mortgage loan purchaser. One reason mortgage loanees sell the mortgage loan is to ensure that they have funds to provide mortgage loans to future buyers.

The purchaser of the mortgage loan generally pools a number of mortgage loans, typically 1,000-1,500 mortgage loans, and securitizes the pooled mortgage loans. Securitizing the pool includes issuing a bond, and selling the bond to an investor where the collateral for the bond is the mortgage loans. Investors who have purchased an interest in the bond receive a payment, generally monthly, that is a portion of the aggregate of the payments made on the mortgage loans. Other purchasers hold mortgage loan pools indefinitely, where the purchaser remains the investor in the mortgage loans.

The investor purchases the bond with the hope that the yield over the life of the bond exceeds what was paid for the bond. Investors make money on mortgage loan pools, whether securitized or not, by acquiring them at a price that will bring a targeted yield. For example, a pool of mortgage loans that has a weighted average coupon of 9% will result in a payment stream of 8% (coupon less the fees paid to the servicer and trustee who administer the mortgage loans) as long as the mortgage loans remain outstanding. Most mortgage loans have a thirty year life. If the investor paid 100 cents on the dollar for the pool (for example, if a pool of ten mortgage loans of $100,000 each, with an aggregate balance of $1 million were acquired for $1 million), then the yield would be 8% (8% interest rate×$1 million). If the investor paid less, say 90 cents on the dollar or $900,000, for the same pool, then the yield would be more (8% coupon×$1-million face=$80,000÷$900,000 paid=8.8%).

Generally, investors pay less for mortgage loan pools that carry greater credit risk. Credit risk results from borrowers defaulting on their mortgage loans, i.e., not making payments on the mortgage loan. When this occurs, the mortgage loan is foreclosed, the property is sold, and the sales proceeds are used to pay off as much of the mortgage loan as possible. If proceeds are not enough to pay all of the mortgage loan off, then the difference is a loss. The investor's principal, or investment amount, is reduced by the loss. Thus, for example, the payment received becomes $72,000 (8%×9 loans×$00,000), on an investment that cost $900,000, which brings a yield of 8% ($72,000÷$900,000). The sales proceeds are also returned to the investor. If net proceeds were $20,000, then the investor's invested amount becomes $880,000 ($900,000 paid less returned proceeds of $20,000) and the yield is $72,000÷$880,000, or 8.2%.

Generally, foreclosure action may begin when a mortgage loan becomes 90 days delinquent, i.e., no payments have been made for 90 days. A typical loss for a foreclosed mortgage loan is 33%, which would result in a loss of $33,000 for the foreclosure of a $100,000 mortgage loan. When a mortgage loan is foreclosed, the servicer takes ownership of the property on behalf of the investor and then lists the property for sale. Generally, the list price is approximately the appraised value for the property. The servicer, however, will generally accept less than the listed price for the property in order to quickly sell the property. Realtors are aware of this, and typically counsel their clients to offer less than the list price, which is oftentimes accepted by the servicer and may result in a loss to the investor if the proceeds from the sale do not exceed the outstanding mortgage loan amount.

Another loss that is incurred by the investor stems from missed interest payments. Each missed payment, on an eventually foreclosed mortgage loan, results in a lost interest payment for the investor. However, the industry practice is for the servicer to continue to advance, or pay from its own funds, interest to the investors until the mortgage loan is ultimately foreclosed and the amount of the loss is booked. At that time, the servicer repays itself from the sales proceeds, and the difference is booked as a loss against the investor's investment balance. Accordingly, the longer a foreclosure process takes the more losses that are incurred. Moreover, the longer it takes to identify a mortgagor that is behind on his or her payment, and the longer it takes to assist the mortgagor in correcting his or her difficulty in making payment, if correction is at all possible, then the more likely that significant losses will be incurred if the mortgagor eventually cannot make the mortgage loan payments. Generally, all of the losses are ultimately passed on to the investors. The best result for the investor is when a borrower having difficulty making payments resolves the problem and does not default.

Investors typically have access to only aggregate statistics for a bond. For example, an investor may have access to a delinquency statistic for the entire bond, e.g., 3% of the mortgagors are behind on their payments. The investor, however, does not have access to information regarding each mortgage loan in the pool. Accordingly, the investor has no way of knowing with any certainty whether significant losses will actually be incurred. By not having detailed information, and a format in which to easily digest the detailed information, the investor must rely on generalized assumptions in assessing the performance of a pool. As an example, two identical pools could each have a single $100,000 mortgage loan in loss. Without any additional information, the investor would assume a 33% loss on each mortgage loan, or $66,000 in total, but would not know with any certainty whether the loss would actually occur.

It is against this background that embodiments of the invention were developed.

SUMMARY OF THE INVENTION

Credit risk management involves analyzing loans associated with a pool of loans to reduce losses and preserve investors' yield at the highest level for as long as possible. Loss mitigating activities may be directed at any aspect of a particular loan or pool of loans that poses a risk of loss for the investor. For example, loss mitigating activities may be directed at identifying risky loans before any losses occur to help insure that losses are avoided altogether, helping a borrower having difficulty making payments avoid foreclosure, expediting the foreclosure process to minimize the number of missed interest payments, assuring that the highest possible sales price is obtained for a property that has been foreclosed and identifying a risky pool of loans that an investor may be considering investing in. Aspects of the present invention provide various analytic tools applicable to credit risk management of loan pools, analyzing loan pools for investment purposes, and other pursuits.

One aspect of the present invention involves a method for obtaining an estimated financial outcome, such as a gain or a loss, for a pool of loans. The estimated financial outcome is first calculated for each loan in the pool and then each individual estimated financial outcome is aggregated to obtain the estimated financial outcome for the pool. Thus, the present invention provides financial outcome or loss estimate information for investors both at the loan level and at the pool level. Moreover, the present invention accumulates and uses various statistics at the loan level for estimating the financial outcome thus providing detailed loan level attributes useful for assessing risk.

In one example, the financial outcome estimation method includes obtaining an estimated value for a property associated with a loan from the pool, and obtaining an estimated net proceeds amount from a sale of the property associated with the loan. The method further includes obtaining an estimated liquidation time between a last interest paid date for the loan and a receipt of the net proceeds from the sale of the property, and obtaining an estimated total debt amount for the loan. In one example, the estimated net proceeds is a function of the estimated value for the property, and the estimated total debt is a function of the estimated liquidation time. To obtain the estimated financial outcome from the sale of the property, at the loan level, the method includes deriving the difference between the estimated net proceeds and the estimated total debt. To obtain the estimated financial outcome for the pool, the method further includes applying the estimated financial outcome from the sale of the property associated with the loan to the pool, such as by aggregating the individual estimated financial outcomes.

The operations of obtaining an estimated value for the property and obtaining an estimated liquidation time, in one example, include applying a decision tree to obtain the estimated value for the property and the estimated liquidation time, respectively. One advantage of this aspect of the present invention, is that the decision trees can produce independently useful results along each branch. For example, applying a decision tree to obtain the estimated property value in one embodiment includes the operations of obtaining a list price for the property and obtaining an appraisal for the property. Then, the estimated value for the property is set as the lesser of the list price and the appraisal. Each branch of the decision tree produces a result that is useful for some aspect of credit risk managing loan pools. For example, if a mortgagor is having difficulty making his or her monthly payments and the estimated value of a property is substantially less than the original value of the property, i.e., what it was bought for, then aggressive risk management techniques, such as putting the mortgagor on a payment plan, might be in order to avoid foreclosure and a loss for the pool. In another example, when a mortgage goes to foreclosure, it becomes real estate owned and is sold. Many times servicers look to sell these properties quickly and sometimes accept offers that are substantially less than the fair market value for the property. A credit risk manager can compare the list price for the property with the appraisal value for the property and identify large discrepancies, and then determine if a particular servicer is accepting offers for substantially less than the appraised value for the property.

Another aspect of the present invention involves a method for determining a probability of loss for a loan from the sale of a property associated with the loan. The probability of a loss is useful alone or in conjunction with the estimated loss. For example, an investor may analyze two loans from separate pools each having an estimated loss of $100,000, for an aggregate estimated loss to the investor of $200,000. The probability of loss, however, for the first loan may be 0% and the probability of loss for the second loan may be 50%. Thus, the aggregate estimated loss adjusted for probability for both loans is $50,000 ((0×$100,000)+(50%×$100,000)). With this information the investor understands his or her true risk, which is zero for the first loan and $50,000 for the second loan. The investor can use this information to determine which pool the investor should retain, which pool should be sold, or which seller should be preferred over another. Moreover, with the probability of loss information credit risk management techniques may be focused on the loan with a 50% probability of loss to both reduce the estimated loss and the probability of loss for that loan rather than expending credit risk management techniques on the loan with a zero probability of loss.

In one example, the probability of loss method includes assigning a base probability of loss to the loan and obtaining at least one characteristic of the loan. Then, a probability factor to account for the characteristic of the loan is determined and added to the base probability factor. The characteristics of the loan for which probability factors may be added to the base probability factor include the delinquency status of the loan (e.g., current, 30 days delinquent, 60 days delinquent, 90 days delinquent, first month of foreclosure proceedings, more than one month after the start of foreclosure proceedings, real estate owned, and realized loss), the current loan to value ratio (CLTV) for the loan, the loan type, the property type, any bankruptcy associated with the loan, whether the loan is a low document loan or a FICO loan, whether there is a property issue associated with the loan, whether there was an early payment default, the financing of the loan, and whether there was an exception in the underwriting process.

Another aspect of the invention involves a computer system for credit risk managing a loan pool including at least one loan for a property. In one example, the computer system includes a loss estimation engine for estimating a loss for the at least one loan, and a probability of loss engine for determining a probability of loss for the at least one loan. The loss estimation engine includes a property value estimation module for estimating a value for the property, a net proceeds estimation module for estimating a net proceeds from a sale of the property, a liquidation timing module for estimating a liquidation time between a last interest paid date for the loan and a receipt of the net proceeds from the sale of the property, and a total debt module for estimating a total debt for the loan. The probability of loss engine includes a base probability module for assigning a base probability of loss to the loan, a loan characteristic module for obtaining at least one characteristic of the loan, a probability factor module for determining at least one loss probability factor associated with the loan, wherein the at least one probability factor accounts for the at least one actual characteristic of the loan, and a summation module for summing the at least one probability factor with the base probability of loss, wherein the summation yields the probability of loss for the loan.

Another aspect of the present invention includes a method for generating a loss list for a set of loans that includes accessing a database storing an electronic record of the set of loans including a subset of at least one delinquent loan. The delinquent loan data includes an indication of delinquency and an indication of a value of the property associated with the delinquent loan. The value of the property associated with the delinquent loan is compared with a threshold value, and added to the loss list if the value meets (e.g., equal to or exceeding) the threshold value. The loss list is generally a generated list of loans that each have some particular indication of a risk of loss, such as being 90 days delinquent. The loss list method may further include adding all subprime loans with any delinquent status to the loss list. Aspects of the present invention allow a credit risk manager or other user to add a loan to a watch list of loans that have some heightened risk of loss determined by the person that added the loan to the watch list. The loss list method may further include an operation of adding each loan in the watch list to the loss list.

These summarized aspects of the present invention and others are further described in the detailed description provided below.

BRIEF DESCRIPTION OF THE DRAWINGS

The detailed description will refer to the following drawings, wherein like numerals refer to like elements, and wherein:

FIG. 2 illustrates a credit risk manager user interface according to one embodiment of the invention;

FIG. 4 is a table illustrating some parameters included with the mortgage loan data;

DETAILED DESCRIPTION

The invention will now be described in detail with reference to various embodiments thereof, with some aspects of the invention being described in the accompanying drawings. Numerous specific details are set forth in order to provide a thorough understanding of the invention. In some instances, specific values are presented in the various flowcharts. It will be apparent to those skilled in the art, however, that the invention may be practiced without some or all of the specific details, that operations may be rearranged, that some operations may be eliminated or performed in a different way, that some specific values may also be changed and that other changes may be made without departing from the spirit and scope of the present invention.

The following description refers particularly to application of the invention for analyzing and risk managing mortgage loan pools. However, it should be appreciated that aspects of the invention are applicable to a broad array of credit-backed assets such as credit cards, auto loans and other loans, and is not limited to only mortgage loans. Moreover, aspects of the invention are broadly applicable to analyzing and risk managing any class of investments.

Figure 1:
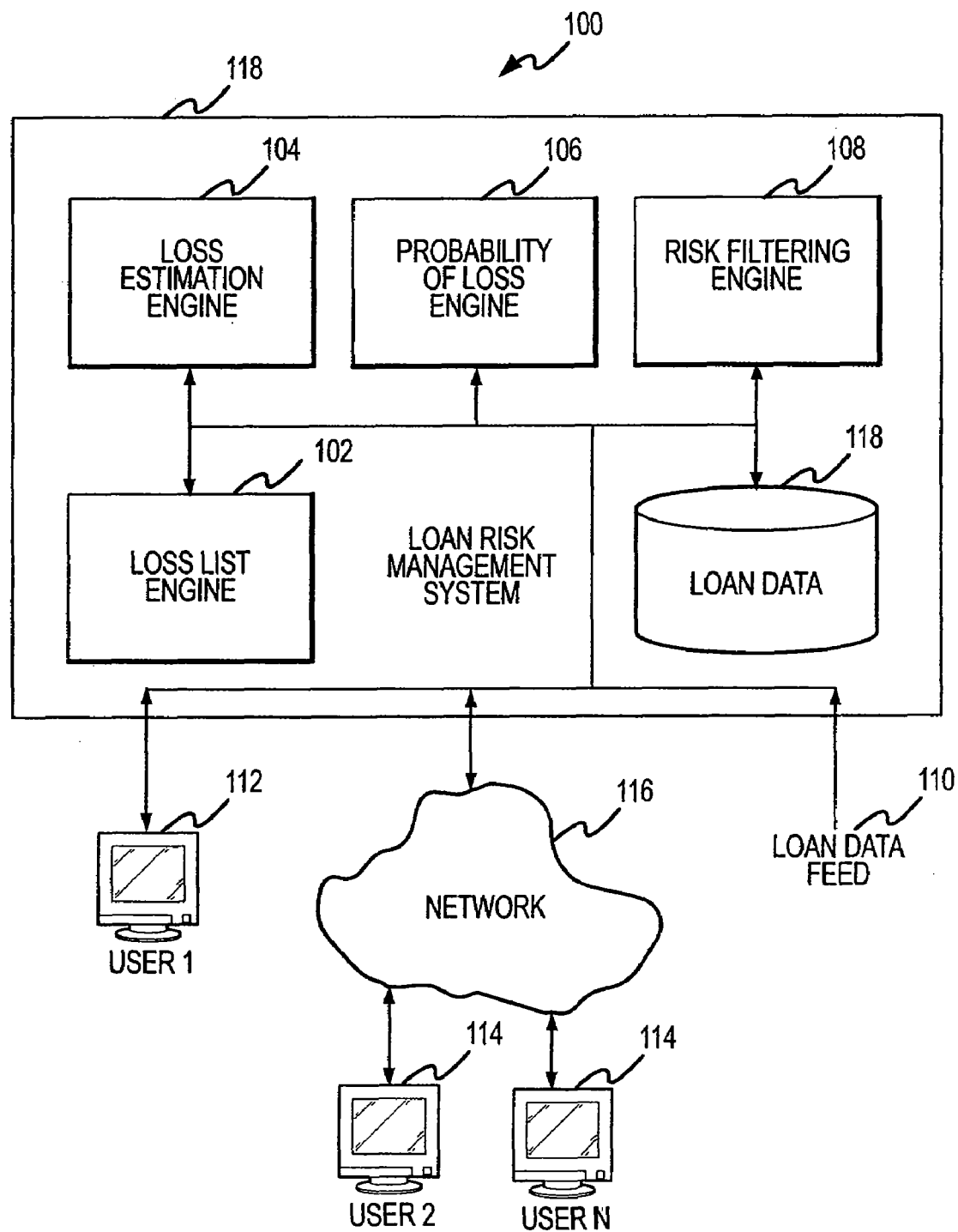
FIG. 1 is a block diagram illustrating a mortgage loan credit risk management system according to one embodiment of the invention, the system including a loss list engine, a loss estimation engine, a probability of loss engine, and a risk-filtering engine.

FIG. 1 is a block diagram illustrating a mortgage loan credit risk management system 100 according to one embodiment of the invention, the system 100 including a loss list engine 102, a loss estimation engine 104, a probability of loss engine 106, and a risk-filtering engine 108. The loss list engine 102 analyzes mortgage loan data 110 that is preferably received as a data feed or manually entered into the system, and generates a list of mortgage loans from a pool of mortgage loans that are at risk of going to loss. A mortgage loan that goes to loss is one in which the proceeds collected upon selling the property, after the servicer has taken back title to the property from the mortgagor, is less than the total amount of the mortgage loan, plus the costs associated with processing the foreclosure and selling the property (e.g., a mortgage loan with a $100,000 balance is foreclosed and the property sold for $20,000, resulting in a loss of $80,000). The loss list is generated by analyzing mortgage loan data information that suggests the mortgage loan will be defaulted on, such as delinquent payments.

The loss estimation engine 104, in one example, analyzes the mortgage loans in the loss list and provides an estimated loss for each mortgage loan should the mortgage loan be defaulted on. Although described herein as estimating losses for the mortgage loans in the loss list, the loss estimation engine 104 may also be used to analyze any other subset of mortgage loans including the entire mortgage loan pool. The probability of loss engine 106 preferably determines a probability of a loss for each mortgage loan in the loss list. The probability of loss used in conjunction with the loss estimate is useful, in part, for an investor to estimate a loss reserve.

Finally, the risk-filtering engine 108 is used to identify potentially troublesome mortgage loans in the pool by applying various risk filters to the pool. For example, the risk filtering engine may filter out all mortgage loans over $650,000 where the mortgagor has missed more than 6 payments in the past 12 months. Potentially risky mortgage loans, such as the preceding example, may be identified with the risk-filtering engine 108 and added to the loss list. In some examples, the risk filters can help to identify risky mortgage loans that are not otherwise identified by the loss list engine 102.

In one embodiment of the system, users 112 may be coupled to the system 100 locally such as by a serial connection, a local area network, or some other connection such as a Bluetooth™ wireless network. Additional users 114 may be coupled to the system from a remote location, such as by a wide area network or the Internet 116. Various levels of access to the system 100 may be provided through a password and user ID system as is known in the art. The system and related methods described below, in one example, are implemented as executable code residing on one or more servers 118. Application packages useful for implementing the present invention, in one example, may include Microsoft Windows 2000 Server™, Microsoft VisualStudio 6.0 Enterprise (Server Pack 4.0)™, Microsoft WAST (Web Application Stress Tool)™, Macromedia Flash 4.0™, Seagate Crystal Reports 8.5 (Developer Edition)™, and SQL 7.0 (Service Pack 2.0)™. Hardware useful in implementing the present invention, in one example, may include Dell PowerEdge™ 300 and 2450 Intel™ Pentium 3™ based machines with 128 MB to 512 MB RAM, and from 1:20 GB Hard Drive to 3:9 GB Hard Drives each. The application packages and hardware are not intended to limit the scope of the invention as defined in the claims, as the application packages and hardware may be substituted to implement the present invention by one of ordinary skill in the art.

FIG. 2 illustrates a credit risk manager user interface 200 of the system 100, which includes a mortgage loan information section 202, an origination information section 204, and a current information section 206. The credit risk manager user interface 200 displays a particular mortgage loan's characteristics, which are stored in the database 118, and displays many of the results generated by the engines (102, 104, 106, 108). In one example, the mortgage loan information section 202 includes the pool or security that a mortgage loan is included in, and the name and address of the mortgagor (borrower). The current information section 206 includes information about the mortgage loan such as the estimated loss from the loss estimation engine and the loss probability from the probability of loss engine. The system introduced above and the various engines used to generate the data displayed in the credit risk manager user interface 200 and other user interfaces are described in more detail below.

I. Loss List Engine

Figure 3:
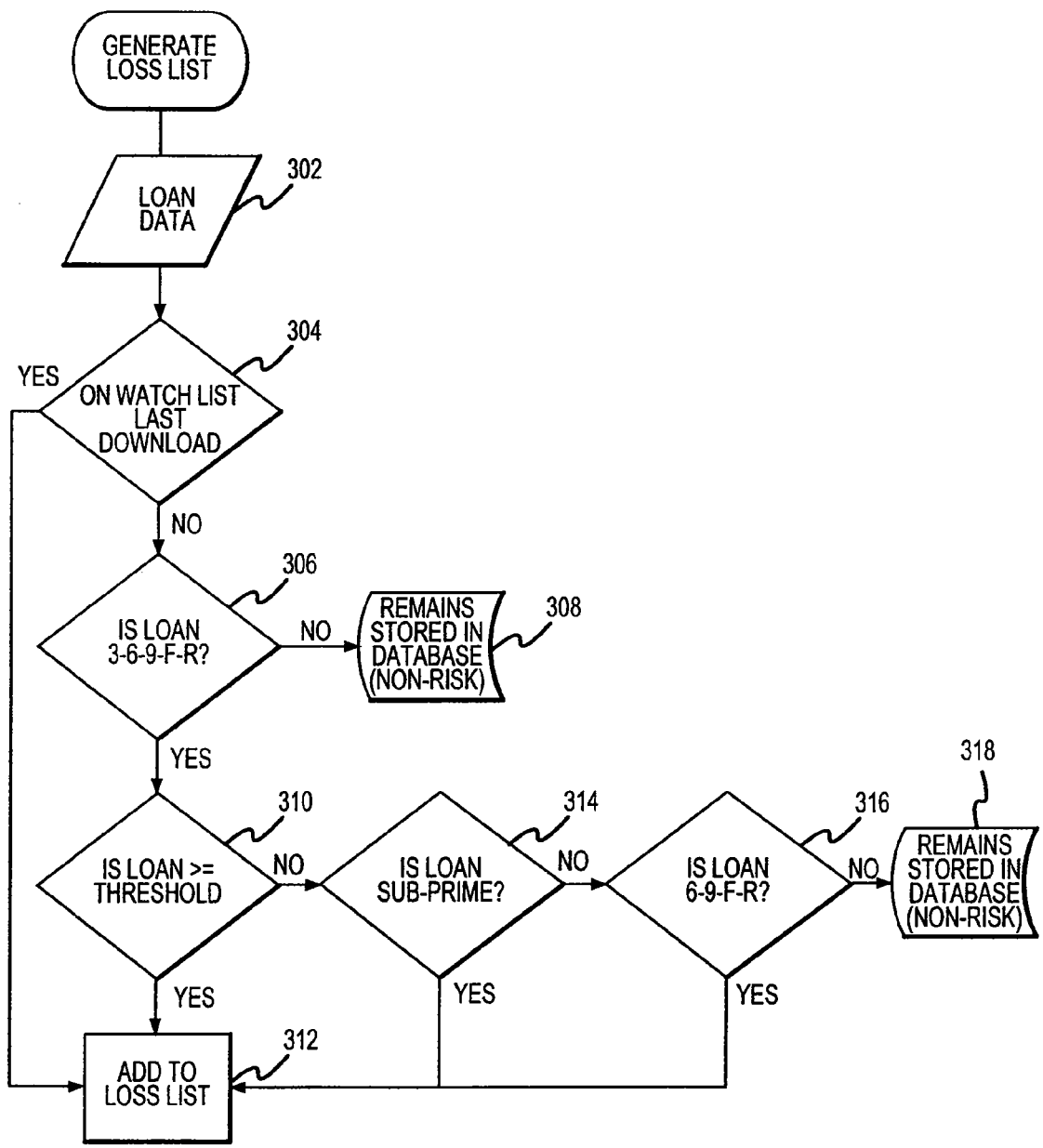
FIG. 3 is a flowchart illustrating a method for generating a loss list according to one embodiment of the invention.

The loss list engine 102, in one example, includes executable software program code to implement a method for generating a list of loans that are at risk of going into loss. FIG. 3 is a flowchart illustrating one method for generating the loss list according to one embodiment of the invention. Generally, a delinquent mortgage loan is any mortgage loan where a payment is not made in a timely manner. In the method illustrated in FIG. 3, mortgage loans are included in the loss list when there is a risk of a loss, such as is indicated by a delinquent mortgage loan, and hence a risk of a loss to the investor. The system 100 includes the database 118 where mortgage loan information is stored. The mortgage loan information preferably includes various parameters representative of the mortgage loan status including a delinquency history for the mortgage loan. The delinquency history, in one example, is represented by a string of codes that reflect the status of each month's payment on the mortgage loan. For example, if a single month's payment is missed, then a "3" will be in the delinquency history for the missed month indicating thirty days of delinquency, and if a second month's payment is missed, then a "6" will be in the delinquency history for the second missed month indicating sixty days of delinquency. All of the delinquency history codes are described in more detail below.

In one embodiment, all mortgage loans in a particular pool or a combination of selected pools or all pools are analyzed to determine which mortgage loans should be included in the loss list and each mortgage loan potentially in loss is flagged in the database 118. In one example, the loss list does not include every delinquent mortgage loan in the analyzed pool. Rather, only a subset of the delinquent mortgage loans is included in the loss list, which focuses the loss list on only those mortgage loans where it is considered more likely that the mortgagor will be unable to make payments on the mortgage loan to cure the default and eventually will result in a loss or where it is more likely that, if the mortgage loan is not paid, a loss will result.

Referring to FIG. 3, the loss list engine is connected with the database 118 or otherwise provided access to a set of mortgage loan data, such as a pool (operation 302). Referring to FIG. 4, a table illustrating some of the parameters included with the mortgage loan data stored in the database 118 is shown. The mortgage loan data has numerous parameters relating to the mortgage loans, including: a mortgage loan number illustrated in a "Loan Number" column of the table for identifying the mortgage loan (e.g., 0000091700); a first payment date for the mortgage loan illustrated in a "First Payment Date" column of the table (e.g., Jan. 1, 1998), which represents the first date that a payment was due on the mortgage loan after it was closed; and a state illustrated in a "State" column and a zip code illustrated in a "Zip" column (e.g., Colorado 80465), which represents the location of the property relating to the mortgage loan.

As mentioned above, the mortgage loan data includes a delinquency history for the mortgage loan illustrated in a "Delinquency History" column of the table. A "C" code indicates that the mortgage loan is current, and accordingly that the appropriate payments have been made. A mortgage loan that is 30 days delinquent (code "3") indicates that a single payment against the mortgage loan has not been made in a timely manner. A mortgage loan that is 60 days (code "6") delinquent indicates that two consecutive payments on the mortgage loan have not been made in a timely manner. A mortgage loan that is 90 days delinquent (code "9") indicates that three consecutive payments or more on the mortgage loan have not been paid in a timely manner. A mortgage loan in foreclosure (code "F") indicates that foreclosure proceedings have started. A mortgage loan that is real estate owned ("REO," code "R") has been foreclosed and the servicer has taken title to the property from the mortgagor.

An example delinquency history string illustrated in row 1 of the table is C36F999FFFFRRO. In the first month the mortgage loan payments were current as indicated by the "C" in the first position of the delinquency history string. In the second month, a payment was missed making the mortgage loan 30 days delinquent as indicated by the "3" in the second position of the delinquency history string. In the third month, an additional payment was missed making the mortgage loan 60 days delinquent as indicated by the "6." In the fourth month, foreclosure proceedings began on the mortgage loan as indicated by the "F." However, in the fifth month, the delinquency history string shows a "9" indicating 90 days delinquent, which might indicate that a check was received, and the servicer temporarily discontinued foreclosure proceedings against the mortgagor. The mortgage loan remained 90 days delinquent for months six and seven as indicated by the "9" in the sixth and seventh position of the delinquency history string, which might indicate that the mortgagor continued to make monthly payments, but did not pay the delinquent payments (which would be indicated with a "C"). In the eighth month, foreclosure proceedings were started again as indicated by the "F" in the eighth position of the delinquency history string, perhaps because another payment was missed. Foreclosure continued through the eleventh month as indicated by the "F" in the ninth through eleventh positions of the delinquency history string. In month twelve, title was obtained, and that property became REO as indicated by the "R" in the twelfth position. In month fifteen, the status became a null value, indicating the property was sold. A liquidated mortgage loan is indicated with an "O."

Referring again to FIG. 3, all mortgage loans that are currently on a watch list are added to the loss list (operation 304). The watch list is preferably a subset of the loss list that is generated using the risk-filtering engine 108. The generation of the watch list and the risk filters are discussed in more detail below.

After updating the loss list to include loans from the watch list, it is determined whether the mortgage loan is 30 days delinquent, 60 days delinquent, 90 days delinquent, in foreclosure, or REO ("3-6-9-F-R") (operation 306). If the mortgage loan is not 3-6-9-F-R, then the mortgage loan is not included in the loss list (operation 308). This generally indicates that the mortgage loan is current, and accordingly all payments on the mortgage loan are up to date.

If the mortgage loan is 3-6-9-F-R, then the mortgage loan is further analyzed to determine if the balance of the mortgage loan exceeds a threshold amount (operation 310). The threshold amount is programmable, and preferably set at a different amount according to the characteristics of a pool. Generally, a high balance mortgage loan may result in a large loss if the mortgage loan is foreclosed on, and accordingly represents a higher risk than a mortgage loan of lesser amount. The threshold amount is the amount in each pool above which any mortgage loan would pose a risk of loss if it defaulted, regardless of its other characteristics. Accordingly, all mortgage loans exceeding the threshold amount that are 3-6-9-F-R are included in the loss list (operation 312).

An exemplary threshold amount is $275,000. A mortgage loan pool might be made up primarily of mortgage loans with an average balance of $250,000, with a few mortgage loans with balances in excess of $250,000. In this exemplary mortgage loan pool, mortgage loans with balances more than a few standard deviations away from the average balance of $250,000 pose a greater risk of loss than those mortgage loans whose balances are approximately $250,000. The threshold amount of $275,000 will indicate those loans that pose a greater loss by a meaningful amount (i.e., by more than a few standard deviations from the average mortgage loan balance in the pool) than the mortgage loans in the pool whose balances are approximately at or below the average. Next, all mortgage loans with a balance less than the threshold amount are analyzed to identify subprime mortgage loans (operation 314). Generally, subprime mortgage loans include any mortgage loans that are given to applicants with a flawed credit history, such as a bankruptcy filing or a history of delinquencies. Subprime mortgage loans are oftentimes considered a higher risk than prime mortgage loans, which are given to applicants without a flawed credit history. Accordingly, all subprime mortgage loans that are 3-6-9-F-R are included in the loss list (operation 312).

All prime or alternative credit mortgage loans are analyzed to identify whether the mortgage loan is 60 days delinquent, 90 days delinquent, in foreclosure, or REO ("6-9-F-R") (operation 316). Prime or alternative credit mortgage loans that are 6-9-F-R are included in the loss list (operation 312). In the method as illustrated in FIG. 3, mortgage loans that are only 30 days delinquent and not high risk, e.g., less than the threshold amount and not on the watch list the prior month, are not included in the loss list (operation 318). This focuses the loss list on the more risky mortgage loans, and does not include mortgage loans where perhaps a single missed payment was simply a mistake and not indicative of the mortgagor having difficulty making payments. Non-sequential missed payments, which may pose a risk but are not captured and added to the loss list by the loss list engine in some embodiments, may be captured using the risk filters as discussed below.

II. Loss Estimate Engine

The loss estimation engine 104 includes software program code to implement a method for estimating a financial outcome or loss associated with a foreclosure on a mortgage loan. In one aspect of the present invention, a loss is estimated for each mortgage loan identified in the loss list. The estimated loss represents an estimation of the loss (or gain) resulting from a foreclosure and eventual liquidation of a mortgage loan. Losses incurred as a result of foreclosure proceedings are mostly due to foreclosure expenses including missed mortgage loan payments and fees associated with the foreclosure proceedings. After a foreclosure proceeding is completed, the party responsible for administering a mortgage loan, typically a servicer, takes ownership of the foreclosed property and sells the property. In another aspect of the present invention, the estimated losses for each mortgage loan in a pool are aggregated to obtain an estimated financial outcome (or loss) for the pool.

The loss estimate provided by the loss estimation engine 104 is useful to both investors and credit risk managers. For example, investors can more accurately assess risk by knowing the estimated loss for each mortgage loan in the loss list and an aggregate loss estimate for the pool. A pool having 30 mortgage loans in foreclosure, for example, but with an aggregate financial outcome estimate value that indicates a gain is likely if the mortgage loans are foreclosed, perhaps from property value appreciation, does not, in reality, pose a substantial risk to the investor. The fact that 30 mortgage loans were in foreclosure, however, without more information would likely have caused concern to the investor.

The credit risk manager can implement and prioritize mitigating actions, such as investigating and correcting foreclosure delays, for those mortgage loans that have the highest estimated losses and thereby oftentimes reduce the actual losses. For example, by correcting foreclosure delay, the lost interest payments associated with the delay are reduced or eliminated. The loss estimate is also used in conjunction with the probability of loss determination to project a loss reserve for a bond, which is described in more detail below.

Figure 5:
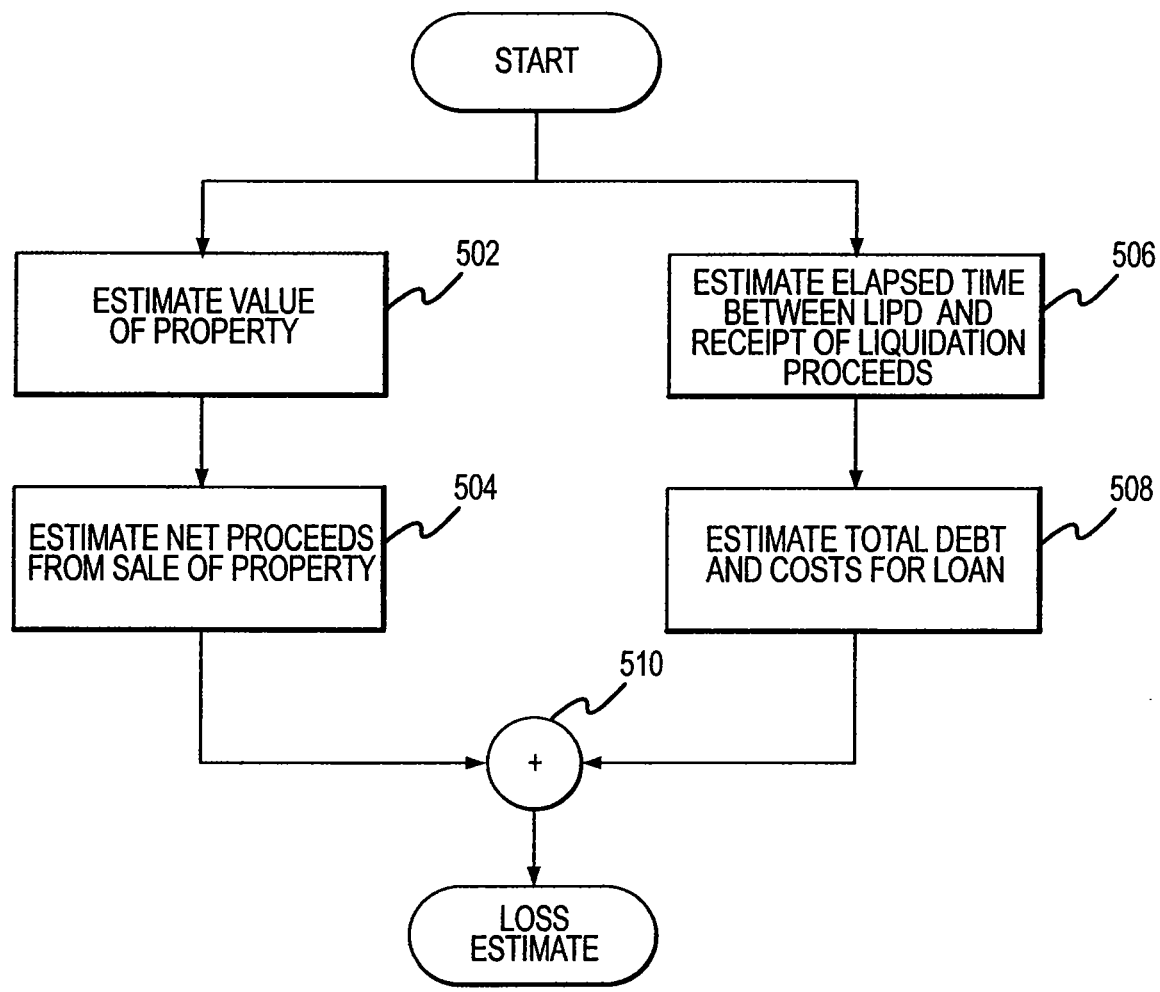
FIG. 5 is a flowchart illustrating a method for estimating a loss from a foreclosure on a mortgage loan according to one embodiment of the invention.

FIG. 5 is a flowchart illustrating a method for estimating a loss from a foreclosure on a mortgage loan according to one aspect of the present invention. The loss estimate is generally an estimate of the net proceeds from selling the property less an estimate of the total debt and costs for the mortgage loan. To estimate the net proceeds from the sale of a property associated with a mortgage loan, first the value of the property associated with a mortgage loan in the loss list is estimated (operation 502). In one example, the most accurate predictor of the sales price for the property on the open market is used to estimate the value of the property. For example, if property associated with a mortgage loan in the loss list has already been foreclosed and sold, then the actual sales price for the property is used to estimate the value of the property. Next, the net proceeds resulting from the sale of property is estimated (operation 504), which is preferably a function of the estimated value of the property and the expenses and costs related to selling the property.

To estimate the total debt and cost for the mortgage loans, first an elapsed time from a last interest paid date to the receipt of the liquidation proceeds received from the sale of the property, i.e., liquidation time ("LT"), is estimated (operation 506). The LT is important, for example, because for each payment missed by a mortgagor the investor's return on the pool is reduced by an interest payment. Next, the total debt and costs of the mortgage loan is estimated (operation 508). In one embodiment of the invention, the total debt of the mortgage loan is a function of the LT. To estimate the loss for the mortgage loan (operation 510), the estimated total debt of the mortgage loan (from operation 508) is subtracted from the estimated net proceeds (from operation 504). For example, a loss estimate is generated for each mortgage loan in the loss list according to the method illustrated in the flowchart of FIG. 5.

FIGS. 6-11 are flowcharts illustrating various methods related to the method for estimating a loss illustrated in FIG. 5. In some of these flowcharts, specific values are set forth in a particular order according to one embodiment of the invention. It should be recognized, however, that some of the specific values may be changed and the operation presented in a different order, or eliminated entirely, without departing from the spirit and scope of the invention.

A. Estimating the Value of the Property

Figure 6:
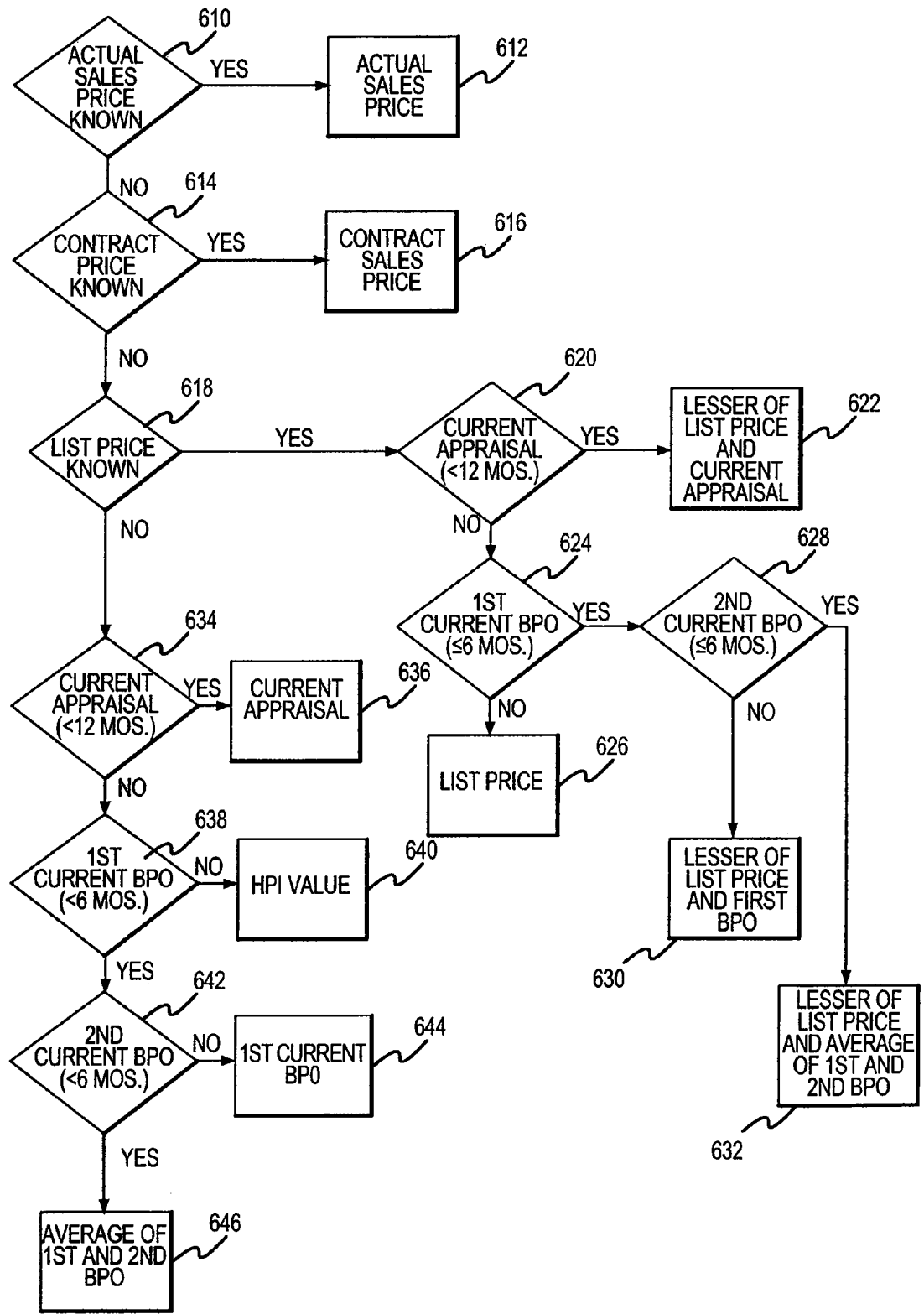
FIG. 6 is a flowchart illustrating a method for estimating a value of a property according to one embodiment of the invention.

FIG. 6 is a flowchart illustrating a method for estimating the value of a property according to one aspect of the present invention. This method is useful, in part, in estimating the value of a property (operation 502) in conjunction with determining the loss estimate. The ultimate value of the property and the most accurate predictor of the price for the property on the open market is the actual sales price for the property, which in some instances will be known. Accordingly, the estimation of the value of the property begins with determining if the actual sales price for the property related to the mortgage loan is known (operation 610). If the actual sales price is known, then the estimated value of the property is set as the actual sales price for the property (operation 612).

Following the actual sales price for the property, the next most accurate predictor of the value of the property is considered to be the contract price for the property. Until the contract closes and the sale is complete, the actual sales price for the property is unknown. This is because the contract may fall through and not close, for instance because an appraisal on the property comes in at a lower value than the contract price, or because an inspection may turn up problems with the property that will lower the price, or because the contract may be broken for other reasons such as the buyer's failure to obtain a loan to purchase the property. Accordingly, if the actual sales price is not available, it is determined whether there is a contract on the property, and what the contract price is (operation 614). If the contract price for the property related to the mortgage loan is known, then the contract price is set as the estimated value of the property (operation 616).

After the contract price, the next most accurate predictors of the value of the property are considered to be the list price for the property, the current appraisal, or one or more current Broker Price Opinions ("BPO"). First, it is determined whether the list price is known (operation 618). If the list price is known, then it is determined whether there is a current appraisal for the property (operation 620). An appraisal is considered "current" if the appraisal was performed less than 12 months before the value of the property is being estimated. A current appraisal, however, may be established as less than 12 months or greater than 12 months to more accurately reflect market conditions in the area of the property. For example, in a rapidly growing market an appraisal that was performed within six months may be required to account for market conditions, whereas in a stagnant market an appraisal that was performed within 18 months may be adequate to account for market conditions. If there is a current appraisal and the list price is known, then the lesser of the list price and the current appraisal is set as the estimated value of the property (operation 622). Realtors often list a property for slightly more than they expect to actually receive for the property to provide price flexibility during negotiations with potential buyers. Accordingly, the lesser of the list price and the appraisal is considered to more accurately reflect the value of the property.

If there is no current appraisal, then the list price is compared with any current BPOs for the property. Accordingly, it is determined whether there is a current BPO for the property (operation 624). The BPO is an opinion of the value of the property by a real estate broker, and is considered "current" if it was performed less than six months before the value of the property is being estimated. A "current" broker price opinion may be established as less than or more than six months to more accurately reflect market conditions. Generally, the accuracy of the BPO depends to some extent on the level of familiarity that a real estate broker has with the specific area that a property is located in. Accordingly, the accuracy of the BPO may vary depending on the broker that performs the BPO. If there is a current BPO, then it is determined whether there is a second current BPO (operation 628). If there is a second current BPO, then the lesser of the list price and the average of the first and second current BPO is set as the estimated value of the property (operation 632). BPOs are based on opinion and are not substantiated by actual interior property inspections; accordingly, BPOs in some cases vary widely between brokers. An average is taken between the first and second current BPO to account for any discrepancy between them.

If there is not a second current BPO, then the lesser of the list price and the first current BPO is set as the estimated value of the property (operation 630). The lesser of the list price and the first BPO (or average BPO) value accounts for the situation when realtors list at a higher price than they plan to obtain. Finally, if there is not a current BPO and there is not a current appraisal, then the list price for the property is set as the estimated value of the property (operation 626).

Following the list price alone or in combination with an appraisal or a BPO, the next most accurate estimation of the value of the property is considered to be a current appraisal for the property because the listing agent is considered to more accurately understand the value of the property as compared with one appraiser, who might have visited the property 12 months ago. Accordingly, it is determined whether there is a current appraisal for the property (operation 634). As mentioned above, the appraisal is considered current if it was obtained less than 12 months before the valuation of the property. If there is a current appraisal, then it is set as the estimated value of the property (operation 636).

After the current appraisal for the property, the next most accurate predictor of the value of the property is considered to be any current BPOs. An appraisal of the property generally includes a formal comparison of the sales price for similar properties in an area and a thorough interior and exterior property inspection, and is accordingly considered more accurate than a BPO, which does not include the same formality or investigation. If there is not a current appraisal, then it is determined whether there is a current BPO (operation 638). As mentioned above, the BPO is considered current if it was performed less than six months before the date the value is being estimated.

If there is not a current BPO, then a value derived from a Housing Price Index ("HPI") is set as the estimated value of the property (operation 640). The HPI, in one example, is the value of the property determined using Freddie Mac statistics, which estimates the value of the property by applying a percentage increase to the original value of the property based on location. Freddie Mac statistics are published quarterly. They show a rate of increase or decrease in property values for a given zip code since the end of the preceding quarter. The value of a property is computed by increasing or decreasing its value from the time it was originated by the cumulative increase or decrease in value reported by Freddie Mac since the time of its origination. The Freddie Mac statistics are kept in a table, known in the art, of the most recently published quarterly HPI statistics. If there is a current BPO, then it is determined whether there is a second current BPO (operation 642). If there is not a second current BPO, then the first current BPO is set as the estimated value of the property (operation 644). If there is a second current BPO, then the average of the first current BPO and the second current BPO is set as the estimated value of the property (operation 646).

The estimated value of the property is used to estimate the net proceeds from sale of the property which is described in more detail below with regard to FIG. 8. The estimated net proceeds from the sale of the property is used to estimate the loss on the property, should it proceed through foreclosure and be sold. Estimated loss on a property is also used by a credit risk manager to evaluate alternative strategies for mitigating the loss on the mortgage loan. For instance, the property could be taken through foreclosure and sold, or it might be determined that a more favorable outcome would result from extending payment terms to the mortgagor so that foreclosure and the costs and risks associated with it are avoided.

B. Estimating the Liquidation Timing

Figure 7:
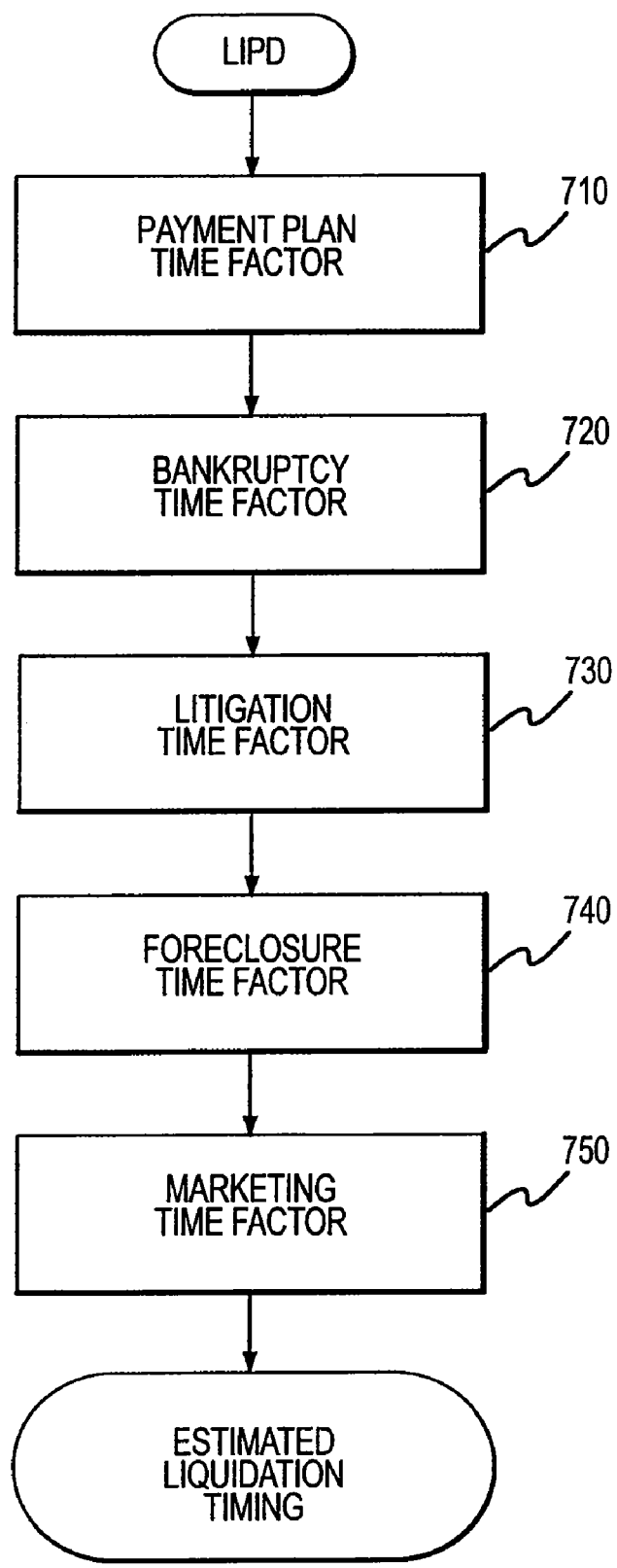
FIG. 7 is a flowchart illustrating a first method for estimating liquidation timing for a mortgage loan foreclosure according to one embodiment of the invention.

FIG. 7 is a flowchart illustrating a first method for estimating the liquidation timing (LT), which, in one example, is the elapsed time between the last payment made on the mortgage loan and the receipt of the liquidation proceeds from the sale of the property after foreclosure. The LT is used to estimate the total debt of the mortgage loan as discussed in more detail below with regard to FIG. 10. The LT is also used by a credit risk manager to identify mortgage loans that are predicted to proceed through foreclosure and liquidation in a time period that exceeds the normal time period for a similar loan. An LT that indicates a much longer time period from last interest paid date through liquidation and receipt of proceeds might suggest a problem, such as pending litigation or lost mortgage loan documents, that could be resolved if appropriate corrective action is taken. An excessively long timeline could also indicate to the credit risk manager or the investor that a geographic area is showing signs of distress if, for instance, several mortgage loans from the same geographic area show a sudden increase in LT. Another way that LT can be used is to identify a servicer that is not processing foreclosures according to the expected timeline. An LT that exceeds the timeline that is expected according to the servicer's stated policies also indicates that the servicer is not adhering to the policies that it has represented to be in place.

The LT determination begins with the last interest paid date ("LIPD"), which is the last date that a payment was received on the mortgage loan, e.g., a hypothetical LT might begin with an LIPD of Jan. 1, 2001. Next, one or more time factors are added to the LIPD to estimate the LT. First, a first time factor to account for a payment plan is added to the LT ($TF_{payplan}$) (operation 710). Oftentimes, if a mortgagor is in trouble, the servicer may put the mortgagor on a payment plan, which is intended to give the mortgagor extra time to catch up on delinquent payments. The first time factor, in one example, is the amount of time that the payment plan provides for the mortgagor to catch up on delinquent payments. For example, a servicer may give a mortgagor three months to catch up on payments, which would be added to the LIPD and would change the hypothetical LT to Apr. 1, 2001 (Jan. 1, 2001+3 mo.).

Next, a second time factor to account for any bankruptcy proceeding related to the property is added to the LT ($TF_{bankruptcy}$) (operation 720). There are numerous statutory bankruptcy proceedings, such as chapter 11 or chapter 13, under the U.S. Bankruptcy Code, which typically take some amount of time to complete. The second time factor, in one example, is an estimate of the amount of time to account for the bankruptcy chapter the mortgagor is in. For example, a chapter 13 bankruptcy proceeding may take an average of three months; accordingly, the second time factor for a chapter 13 bankruptcy proceeding is preferably three months. Referring to the hypothetical LT, the LT adjusted to account for chapter 13 bankruptcy proceedings is Apr. 1, 2001+3 months=Jul. 1, 2001.

Next, a third time factor to account for litigation is added to the LT ($TF_{litigation}$) (operation 730). The third time factor is set to 12 months, in one example, if there is litigation relating to the mortgage loan. A mortgagor might initiate litigation if payments are disputed, such as when the mortgagor claims to have sent payments but the servicer has no record of receiving them. A mortgagor might also contest the servicer's legal right to foreclose. In any case, litigation is typically time consuming because of court backlogs, the ease with which a mortgagor can delay scheduled hearings, and a generally mortgagor-friendly U.S. court system. Twelve months is the amount of time that is typically experienced as a delay, regardless of the nature of the litigation. If there is no litigation, then the third time factor is set to zero. Referring to the hypothetical LT, the LT adjusted to account for litigation is Jul. 1, 2001+12 months=Jul. 1, 2002.

Next, a fourth time factor to account for foreclosure proceedings is added to the LT ($TF_{foreclosure}$) (operation 740). The fourth time factor, in one example, is a function of the start date of the foreclosure proceedings and any state-specific foreclosure timing and other foreclosure issues (e.g., redemption periods). To account for state specific foreclosure timing and other issues, reference is made to a table, known in the art, of published expected foreclosure times by state. Referring to the hypothetical, a mortgage loan in New Jersey is expected to take 12 months to foreclose, resulting in an adjusted hypothetical LT of Jul. 1, 2002 +12 months=Jul. 1, 2003.

After the conclusion of the foreclosure proceedings, in one example, a fifth time factor to account for a marketing period to sell the property is added to the LT ($TF_{REOmarketing}$) (operation 750). Marketing a property depends on a number of factors including the type of property, the strength or weakness of the real estate market, the value and condition of the property, and whether any eviction from the property is required. The fifth time factor takes these and other factors into account. For example, if the property will require extensive repair work to facilitate the sale of the property, but no eviction from the property is required, then six months is added to the LT. Referring to the hypothetical, the LT adjusted to account for marketing the property is Jul. 1, 2003+6 months=Jan. 1, 2004.

The various events related to the time factors discussed above generally occur serially, i.e., one does not begin until the other concludes. Therefore, in one implementation of the method of FIG. 7, the LT is adjusted by adding each time factor to the LT. For example, foreclosure proceedings are generally delayed until the conclusion of litigation. It can be seen from the hypothetical litigation timing estimation that months and even years of payments may be missed during all of the various possible proceedings before the liquidation of the property, which account for tremendous losses to the pool. The present invention accounts for the liquidation time in generating the loss estimate as illustrated in FIG. 5 and elsewhere. Moreover, by identifying troublesome loans in the portfolio with the loss estimate, probability of loss, and risk filters, the liquidation timing may be shortened considerably by implementing various loss mitigation activities and focusing those mitigation activities on the troublesome loans.

Figure 8:
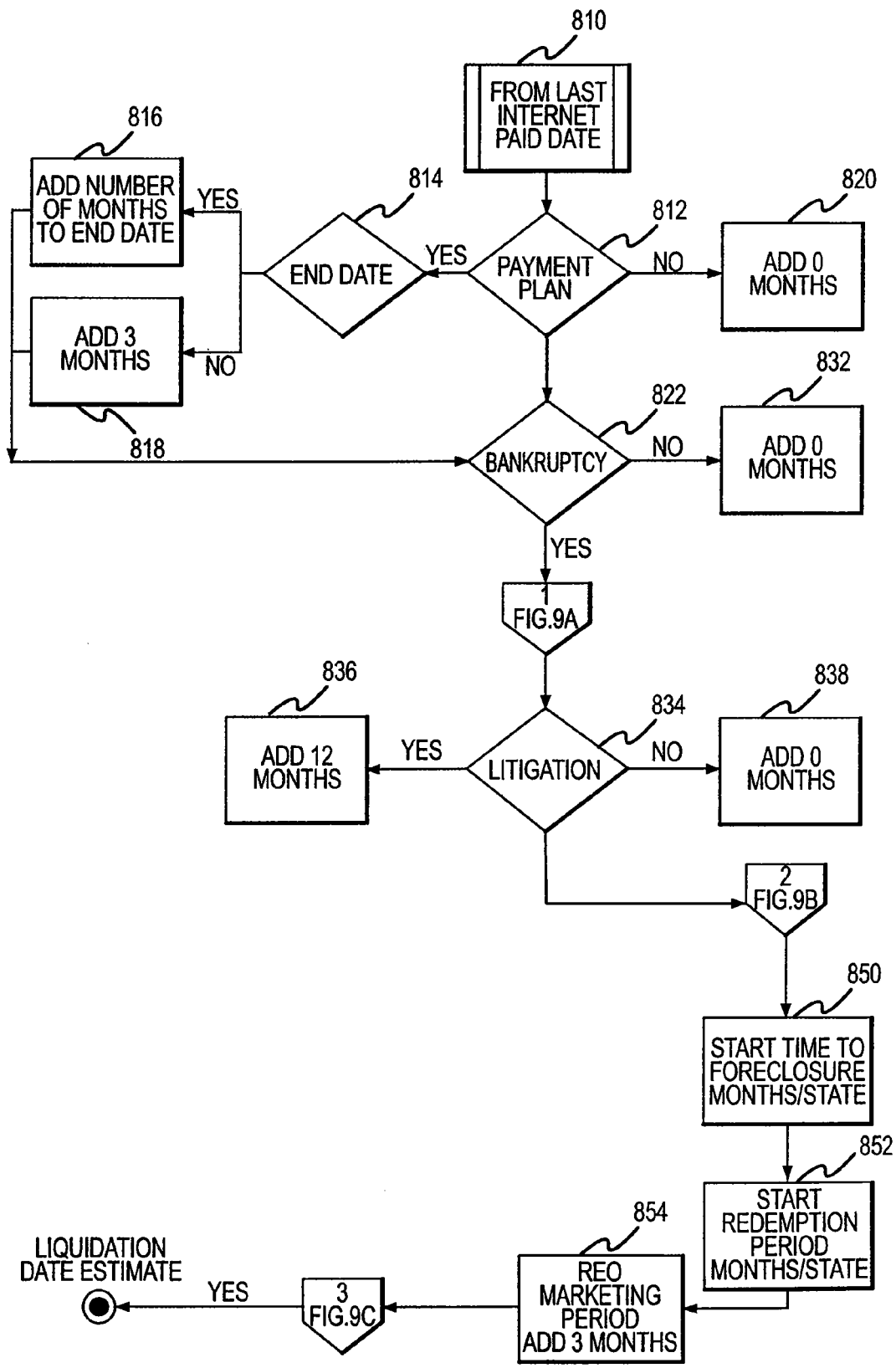
FIG. 8 is a flowchart illustrating a second method for estimating liquidation timing for a mortgage loan foreclosure according to one embodiment of the invention.

FIG. 8 is a flowchart illustrating a second method for estimating the LT according to one aspect of the present invention. The LT determination begins with the LIPD date (operation 810). Operations 812-820 illustrate an aspect of the method for projecting the first time factor to account for a payment plan, i.e., $TF_{payplan}$. First, it is determined whether the mortgagor is on a payment plan (operation 812). The credit risk manager may be told of a payment plan by the servicer and thereafter manually enter the payment plan details in the system, or the mortgage loan data 110 provided by the servicer may have a payment plan flag indicating that a payment plan is in place. If there is a payment plan, then the end date of the payment plan is determined (operation 814). Next, the time between the LIPD and the end date is added to the LT (operation 816). If the end date for the payment plan is unknown, then three months, in one example, is added to the LT (operation 818), which is the typical amount of time allotted for payment plans. If there is no payment plan, then no time is added to the LT (operation 820).

Figure 9A:
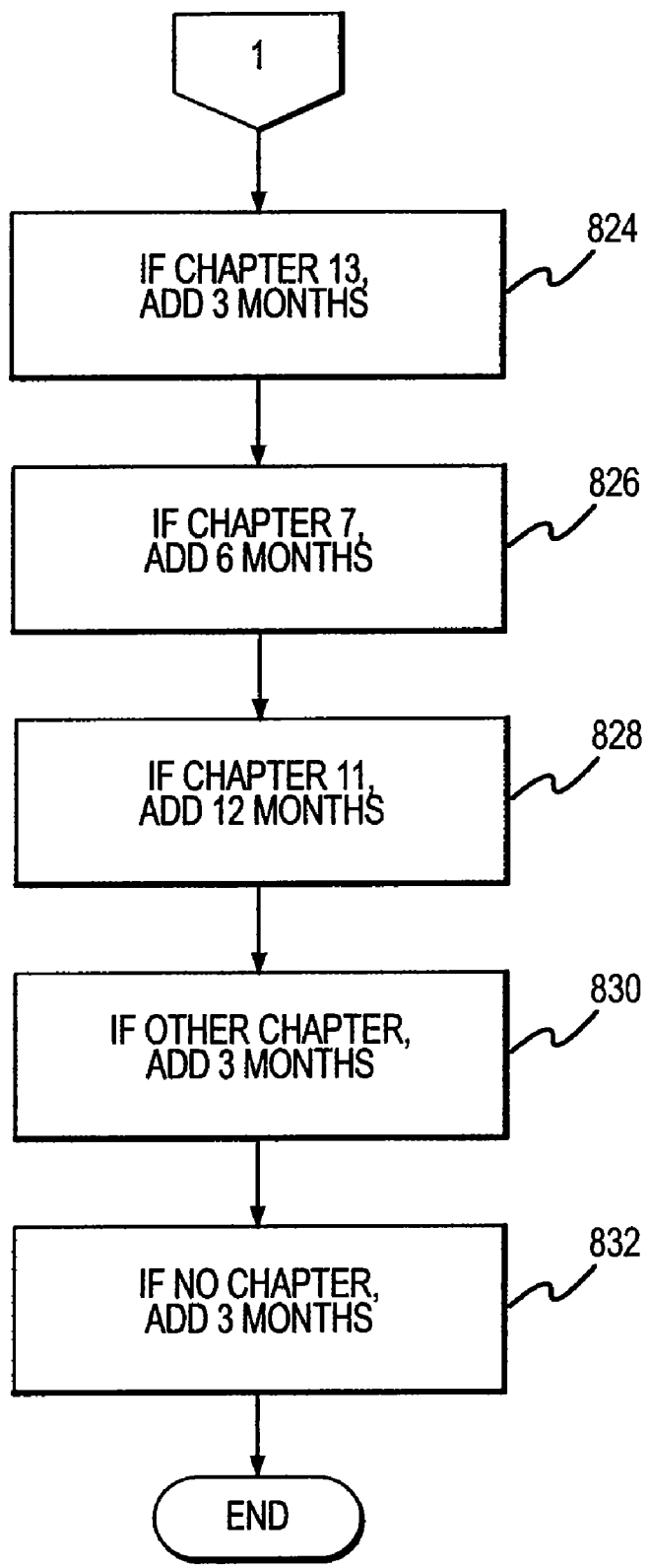
FIG. 9*a* is a flowchart illustrating a method for estimating a time factor to account for bankruptcy proceedings that is useful in the liquidation timing estimation methods illustrated in FIG. 7 and FIG. 8.

After the first time factor determination, it is determined whether there is a bankruptcy proceeding related to the property (operation 822). The credit risk manager may be told of a bankruptcy by the servicer, or a code on the mortgage loan's data record 110 may indicate a bankruptcy. FIG. 9a is a flowchart illustrating a method for determining the second time factor to account for bankruptcy proceedings, i.e., $TF_{bankruptcy}$. Three months are added to the LT if the mortgagor is in chapter 13 bankruptcy (operation 824). Six months are added to the LT if the mortgagor is in chapter 7 bankruptcy (operation 826). Twelve months are added to the LT if the mortgagor is in chapter 11 bankruptcy (operation 828). Three months are added to the LT if the mortgagor is in any other type of bankruptcy proceedings or if the bankruptcy chapter is unknown (operation 830). These particular bankruptcy time factors can be changed whenever necessary. In one embodiment, the start of the bankruptcy proceeding is taken into account. Accordingly, the bankruptcy start date is either added to the bankruptcy timing (if the bankruptcy proceedings are scheduled to start in the future) or the start date is subtracted from the bankruptcy timing (if the bankruptcy proceedings have already begun). Referring again to FIG. 8, if there are no bankruptcy proceedings, then no time is added to the LT (operation 832).

Operations 834-838 an aspect of the method for projecting the third time factor to account for litigation, i.e., $TF_{litigation}$. In operation 834, it is determined whether there is litigation related to the property. If there is litigation involving the property, then 12 months is added to the LT (operation 836). If there is no litigation involving the property, then no time is added to the LT (operation 838).

Operations 840-852 illustrate an aspect of the method for projecting the fourth time factor to account for foreclosure proceedings, i.e., $TF_{foreclosure}$. For purposes of determining the LT, it is preferably assumed that foreclosure will occur. In one example, the fourth time factor to account for foreclosure proceedings includes the time from the start of foreclosure proceedings until the conclusion of foreclosure proceedings.

Figure 9B:
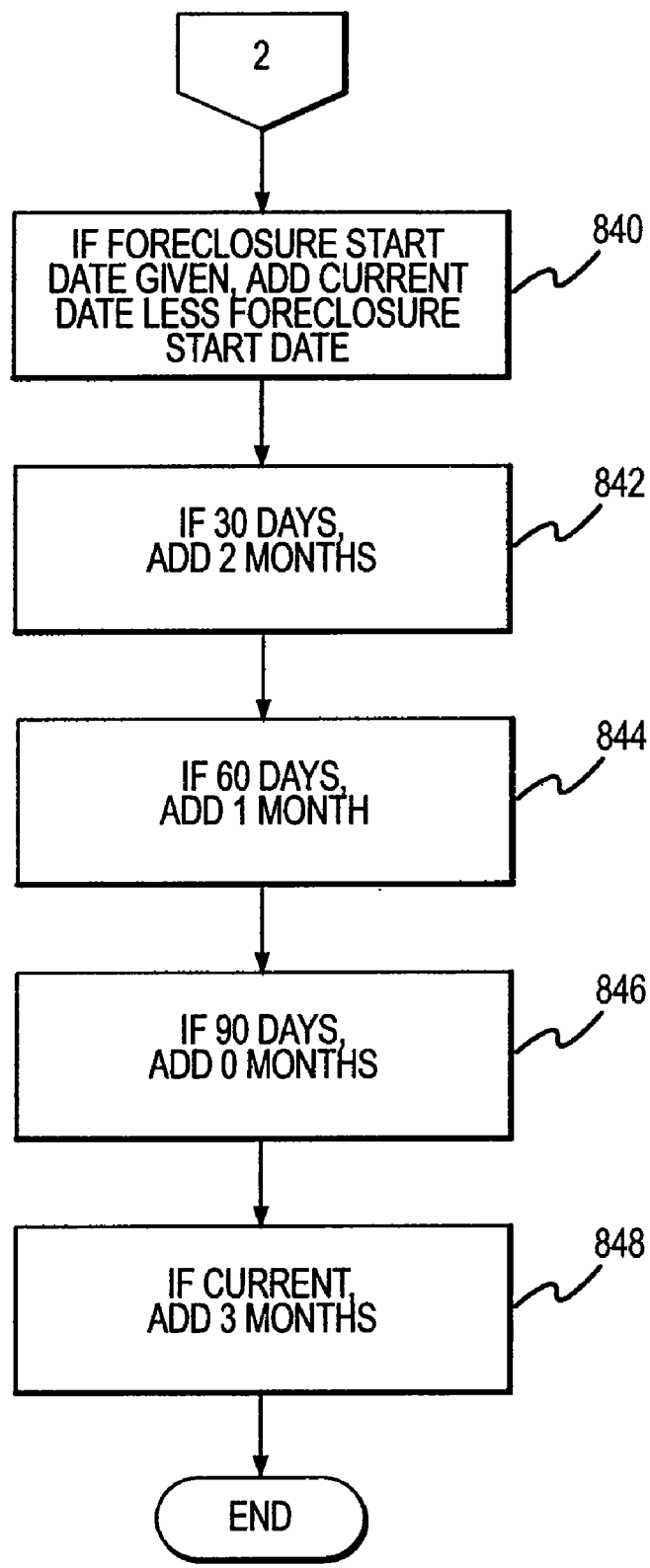
FIG. 9*b* is a flowchart illustrating a method for estimating a time factor to account for foreclosure proceedings that is useful in the liquidation timing estimation methods illustrated in FIG. 7 and FIG. 8.

The projection of the fourth time factor begins with determining the start date for foreclosure proceedings. FIG. 9b illustrates a method for projecting the start date for foreclosure proceedings. If the start date of the foreclosure proceeding is known and the foreclosure proceedings have already begun, then the foreclosure start date is subtracted from the current date to determine the foreclosure start date (operation 840). If a foreclosure start date is not given and the mortgage loan is 30 days delinquent, then two months are added to the LT (operation 842). Two months are added to the LT to reflect the fact that it would be at least two months from the current date before foreclosure proceedings would begin when the mortgagor is 30 days delinquent, which is based on the most common industry practice and legal restrictions which generally require 90 days of delinquency before foreclosure is filed. If the mortgagor is 60 days delinquent, then one month is added to the LT (operation 844). If the mortgagor is 90 days delinquent, then preferably no time is added to the LT (operation 846). If the mortgagor is current on his or her payments, then three months is added to the LT (operation 848).

Referring again to FIG. 8, in operation 850, the state specific foreclosure timing is accounted for in the fourth time factor. The total time for foreclosure proceedings is generally state specific. Accordingly, the state specific foreclosure timing is that of the state in which the property is located. For example, 12 months for foreclosure timing is added to the LT for a property in New York State. A time factor to account for state redemption periods is also accounted for in the fourth time factor (operation 852). Generally, the state redemption period is the time period after foreclosure proceedings in which the property owner may make all back payments and reinstate the mortgage loan, avoiding loss of the property through foreclosure. The redemption period is also state specific, and accordingly the time factor for the redemption period is added to the LT according to which state the property is located in. The summation of the start date for foreclosure proceedings, the state specific foreclosure timing, and the state specific redemption period timing comprise the fourth time factor.

Figure 9C:
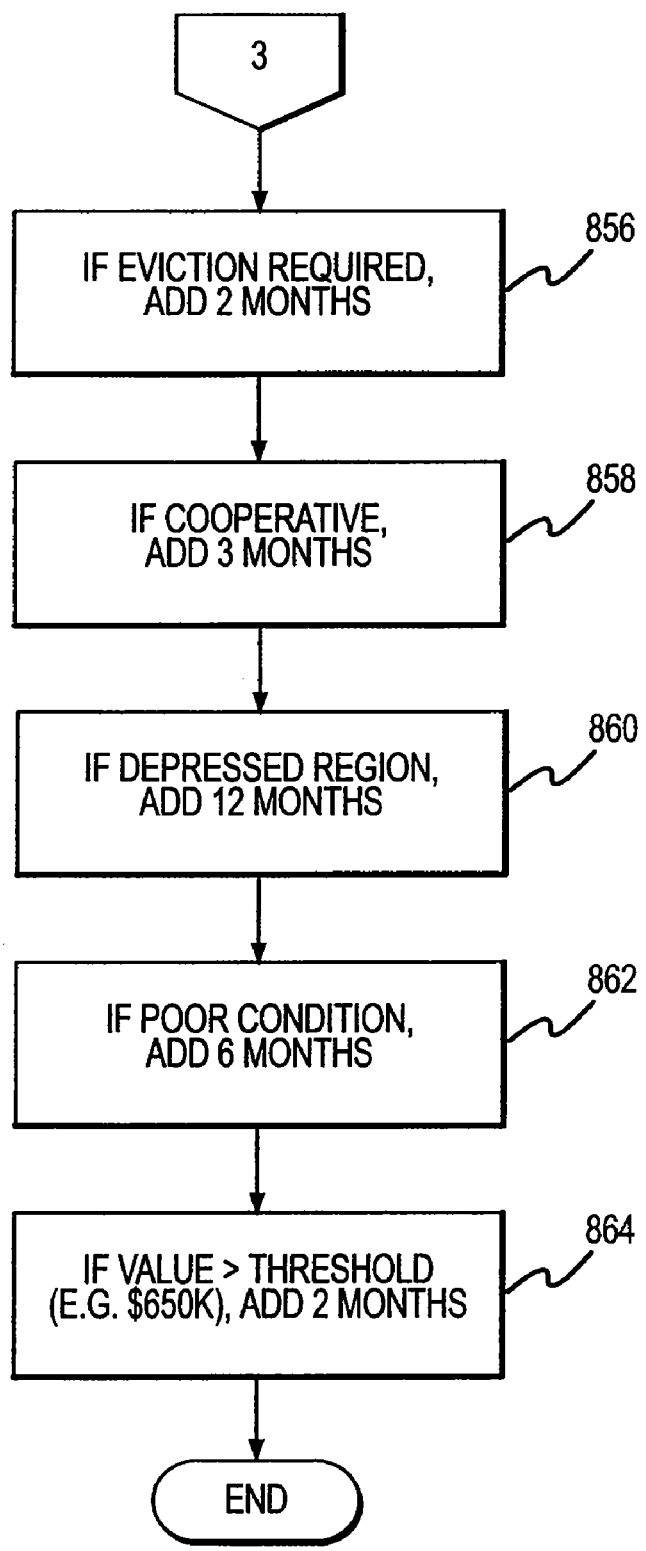
FIG. 9*c* is a flowchart illustrating a method for estimating a time factor to account for marketing a real estate owned property that is useful in the liquidation timing estimation methods illustrated in FIG. 7 and FIG. 8.

Operations 854-864 illustrate one aspect of the method for projecting the fifth time factor to account for the REO marketing period, i.e., $TF_{REOmarketing}$. After all foreclosure proceedings are complete, i.e., when the servicer has title to the property, three months are added to the LT to account for the average time to sell a property after foreclosure proceedings are completed (operation 854). The REO marketing period refers to the time it takes to sell a property after foreclosure proceedings are completed. Referring to FIG. 9c, a flowchart illustrating a method for determining additional REO marketing time factors is shown. Two months are added to the LT if an eviction from the property will be required (operation 856). The time it takes to evict someone from a property is highly variable, and two months is generally the average time required. Three months are added to the LT if the property is a co-op (operation 858). Generally, co-ops are one of the most difficult properties to sell because an owners association likely has to approve the buyer.

Twelve months are added to the LT for a depressed or distressed geographic region (operation 860), which is any real estate market that has experienced a catastrophic event such as an earthquake, has lost a major employer or military base, or has emerged as an area targeted by fraud rings. Depressed regions may be identified anecdotally, identified using HPI or various other publications that provide regional real estate statistics such as those published by research institutions, which are well known in the art. Six months are added to the LT for a property that is in poor condition (operation 862). Generally, a home needing serious repairs, such as a new roof, is considered to be in poor condition. In some circumstances, the correction of the condition may be a requirement for the sale of the property, which may significantly delay the sale of the property. In other circumstances, the property may be sold as is, which may also delay the sale of the property since it will have less buyer appeal. Finally, two months are added for properties with a value of $650,000 or more (operation 864). Generally, higher value properties take longer to sell than lesser-valued properties. The $650,000 value may be changed as necessary to reflect changing market conditions, to reflect the type of properties in a given pool, or to reflect other conditions.

The estimation of the elapsed time from the LIPD to the receipt of the liquidation proceeds for the mortgage loan is determined by a summation of the various time factors discussed above. In one example, the LT is a summation of time factors to account for a payment plan, a bankruptcy proceeding, a litigation, a foreclosure, and an REO marketing period ($LT=LIPD+TF_{payplan}+TF_{bankruptcy}+TF_{litigation}+TF_{foreclosure}+TF_{REOmarketing}$) The LT also provides a projected liquidation date, which is: Liquidation Date=LIPD+ LT. The various time periods discussed above that are used for each time factor, e.g., three months for chapter 13 bankruptcy, are considered preferable. The time periods for each time factor, however, may be changed or manually overridden if conditions change or more particular data is received. The estimated liquidation date is an important piece of information for the investor, as it suggests when a loss will be realized (or, when the investor's yield will be reduced). The estimated liquidation date is also an important piece of information for the credit risk manager, as it may indicate a mortgage loan that is not being serviced properly, if, for instance the estimated liquidation date on a particular mortgage loan is later than the estimated liquidation date for similar mortgage loans, or if the estimated liquidation date is later than the servicer's own predicted estimated liquidation date.

C. Estimating the Net Proceeds

The estimation of the value of the property as described herein is used to estimate the net proceeds from the sale of the property. In one embodiment, the estimation of the net proceeds is determined by subtracting any sales expenses and costs associated with the sale of the property from the estimated value of the property.

Figure 10:
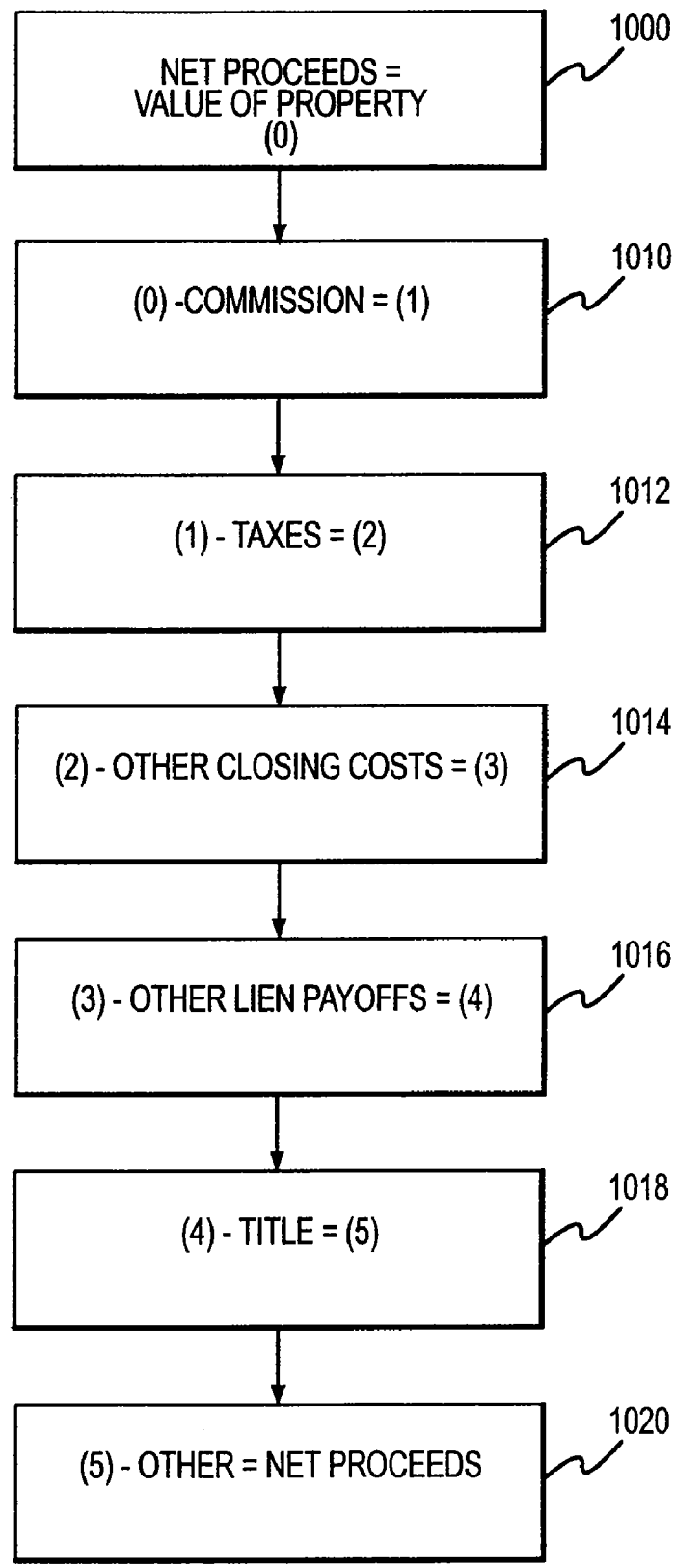
FIG. 10 is a flowchart illustrating a method for estimating net proceeds from the sale of a property according to one embodiment of the invention.

FIG. 10 is a flowchart illustrating a method for estimating the net proceeds from the sale of a property after foreclosure according to one aspect of the present invention. The net proceeds estimation begins with setting the net proceeds as the value of the property (operation 1000), which is estimated as described above with regard to FIG. 6. Next, any commissions for selling the property are subtracted from the value of the property (operation 1010). The commission is typically a percentage of the sales cost for the property that the real estate agent or agents representing the seller and buyer of the property take as a fee for the sale. A commission percentage of 6% is assumed, but may be overridden by the credit risk manager if an actual rate that differs is known.

Next, the amount of any unpaid property taxes for the property are subtracted from the amount determined in operation 1010 (operation 1020). Generally, the unpaid taxes are property taxes that the mortgagor failed to pay prior to forfeiting title of the property to the servicer through foreclosure, and that the servicer must pay in order to obtain clear title to the property. Although a servicer could sell the property once title has been obtained through foreclosure with the taxes still owing, the taxing authority retains the right to place a lien on the property and, eventually, to sell the property at auction in order to pay the owed taxes. Rather than face the risk of losing the property at auction for the amount of taxes, which are commonly just a small fraction of the value of the property, or diminish the value or liquidity of the property by marketing it with this risk attached to it, typically the servicer pays the unpaid taxes and clears the title to the property prior to marketing it for sale. Next, the closing costs for selling the property are subtracted from the value determined in operation 1012 (operation 1014). Closing costs are generally the fees and other costs for processing the sale of the property. Next, other lien payoffs are subtracted from the value determined in operation 1014 (operation 1016). Liens, such as mechanics liens, are placed on the property after the mortgage loan is obtained, and when subsequent work such as installing a patio or replacing a furnace and ductwork is done. Any liens are paid from the proceeds from the sale of the property. Next, any title fees for the property being sold are subtracted from the value determined in operation 1016 (operation 1018). Finally, any other fees or costs associated with the sale of the property are subtracted from the value determined in operation 1018 to arrive at the estimation for the net proceeds (operation 1020). For example, at a closing the seller may agree to pay the buyer for some minor repairs to the property, which would fall under the "other fees or costs."

D. Estimating the Total Debt

Figure 11:
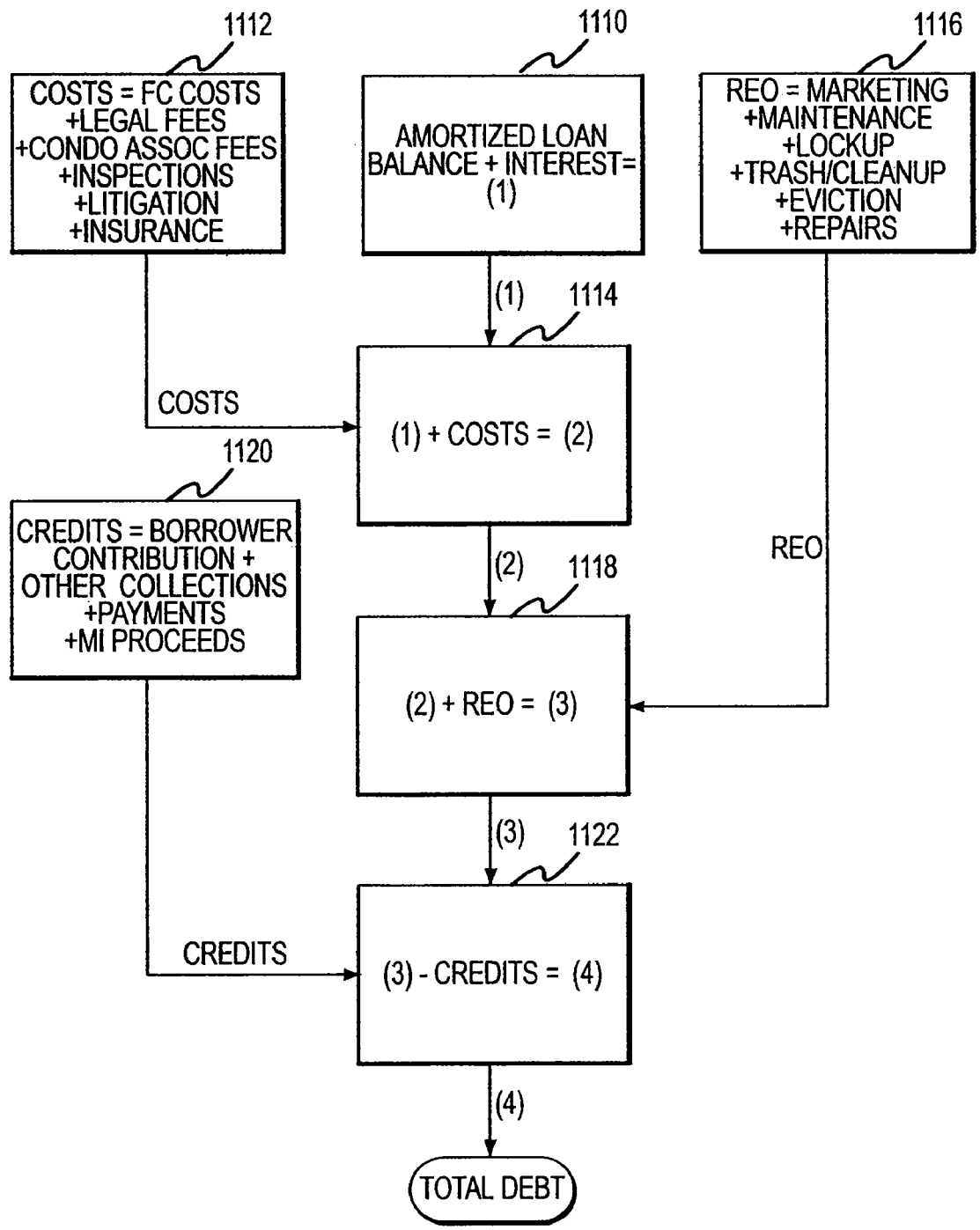
FIG. 11 is a flowchart illustrating a method for estimating the total debt for a mortgage loan according to one embodiment of the invention.

FIG. 11 is a flowchart illustrating a method for estimating the total debt for paying off the mortgage loan according to one aspect of the present invention. A total mortgage loan amount is determined by adding an amortized mortgage loan balance to the total interest advanced or accrued (operation 1110). The amortized mortgage loan balance is the balance outstanding on the mortgage loan on the date of the total debt estimation. The total interest advanced or accrued includes the interest advances since the LIPD, which is based on the LT. Generally, the interest advanced is the mortgage loan interest rate multiplied by the outstanding principle balance on the mortgage loan ("OSPB") multiplied by the LT. In operation 1112, processing costs are determined. In one example, the processing costs include any foreclosure costs, any legal fees associated with the foreclosure, any remaining condominium association fees for the property, any fees for inspections of the property, any litigation costs, and any insurance costs. The processing costs are added to the total mortgage loan amount to arrive at the mortgage loan debt amount (operation 1114).

In operation 1116, the REO cost is determined. In one example, the REO cost includes marketing costs, maintenance costs for the property, lockup costs for the property, trash or cleanup costs for the property, costs related to eviction, and repair costs for the property. The REO cost is added to the mortgage loan debt amount to arrive at a total cost (operation 1118).

In operation 1120, a credit amount is determined. In one example, the credit amount includes any borrower contributions, other collections such as rent payments, other payments, and any mortgage insurance proceeds. The credit amount is subtracted from the total cost to arrive at the total debt (operation 1122). Generally, the total debt refers to the payoff amount to liquidate the mortgage loan.

The difference between the total debt and the proceeds from the sale of the property is a gain if the proceeds exceed the total debt, or a loss if the total debt exceeds the proceeds. Referring again to FIG. 5, the estimated loss from a foreclosure on a mortgage loan according to one aspect of the present invention is the net proceeds less the total debt. Accordingly, if the net proceeds exceed the total debt, then the loss estimation will actually project a gain. Whereas, if the net proceeds are less than the total debt, then the loss estimation will project a loss. The loss estimate is useful in identifying the riskiest mortgage loans for purposes of applying loss mitigation techniques to them. It is also useful, in conjunction with the probability of loss features described later and the expected liquidation date described earlier, in assisting investors in determining loss reserves.

III. Probability of Loss

Figure 12A:
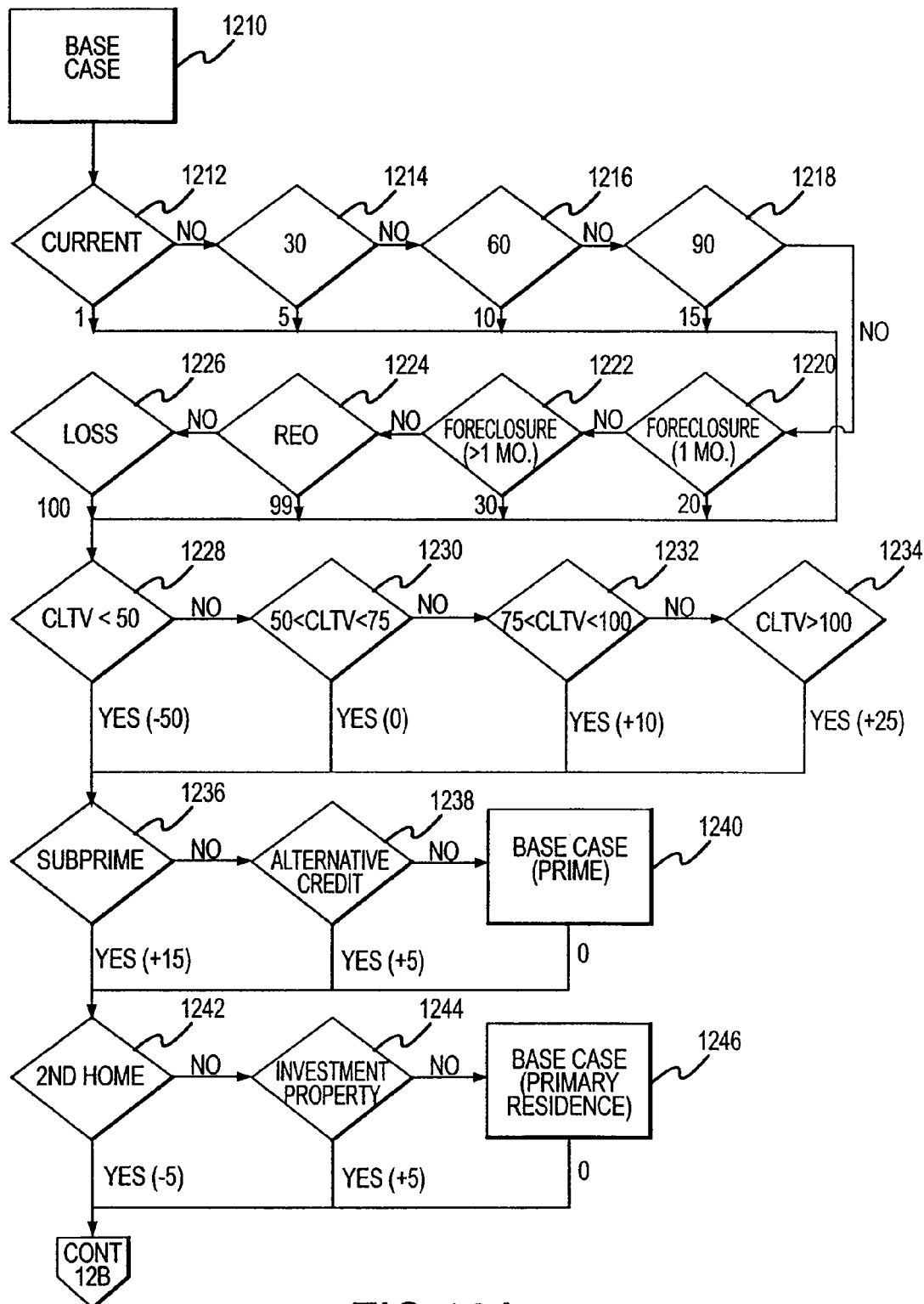
FIGS. 12*a*-12*c* illustrate a method for determining a probability of a loss for a mortgage loan according to one embodiment of the invention.
Figure 12B:
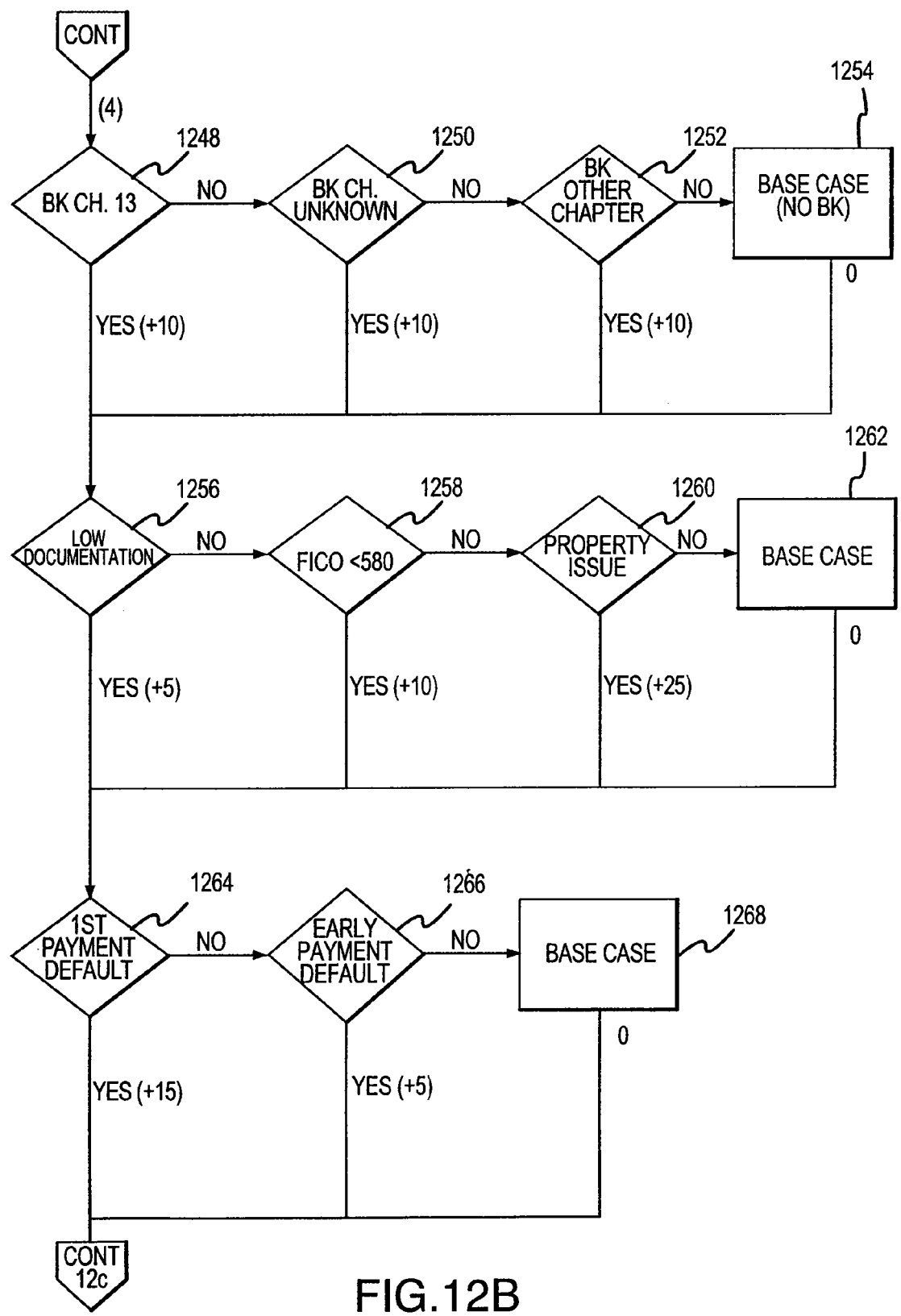
Figure 12C:
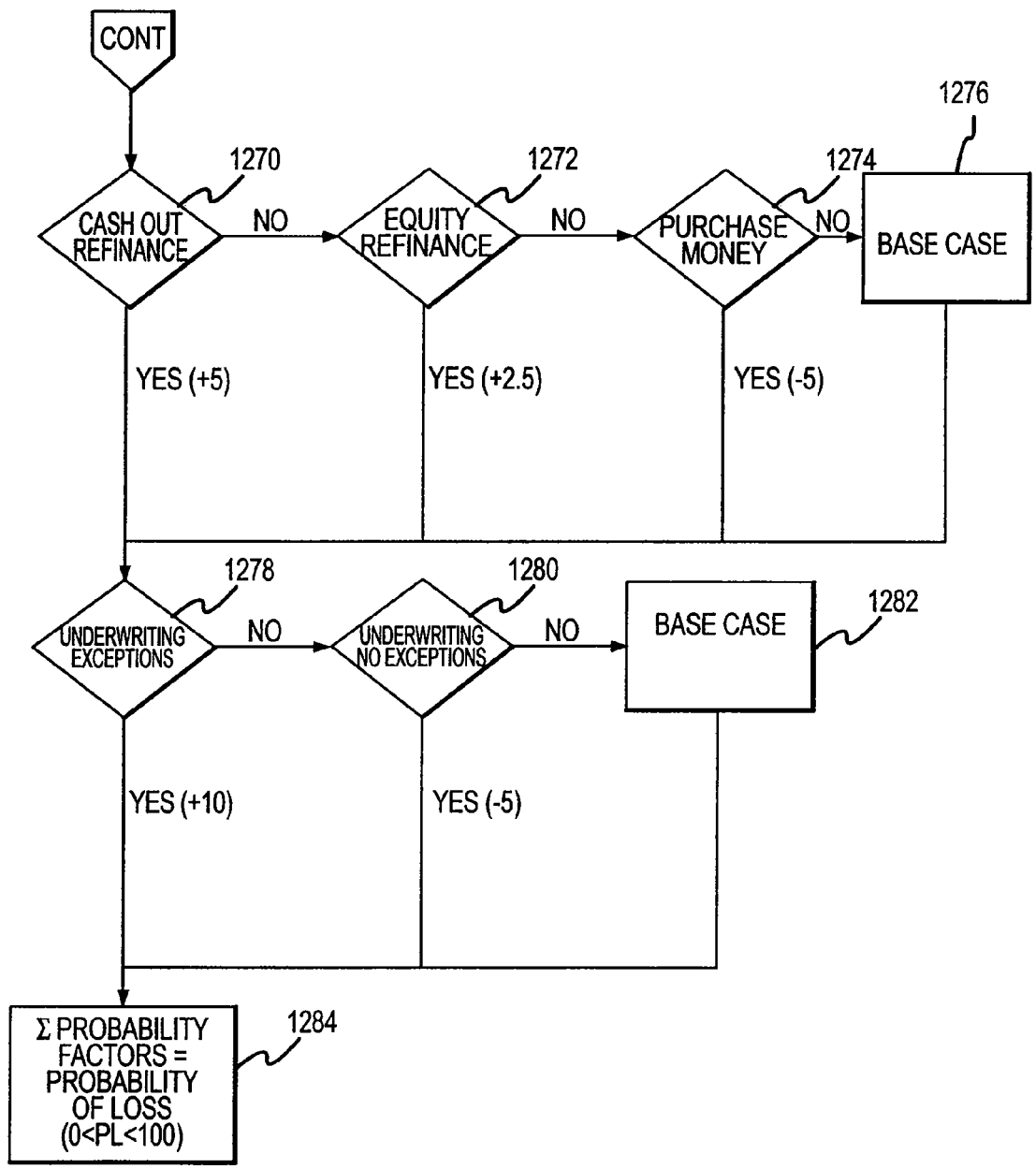

The probability of loss engine 106 includes software program code to implement a method for determining a probability of loss for a mortgage loan according to the present invention. FIGS. 12a-12c are flowcharts illustrating one method for determining a probability of loss for a mortgage loan. The flowcharts illustrated in FIGS. 12a-12c present the probability of loss determination in a particular order and with particular values. It should be recognized, however, that operations may be rearranged or even eliminated, and that the values may be changed without departing from the spirit and scope of the invention.

The probability of loss and the loss estimate are useful for investors to determine how much loss reserve to set aside for a given pool. The loss reserve is an estimate of expected losses on a pool, which must be set aside quarterly as an offset to the expected income on the pool. For example, an investor with $1 million invested in a bond, and a loss estimate of $100,000 should reserve a loss of $100,000. However, if there is less than a 100% probability that the loss is going to be realized, e.g., a 50% probability, then the entire $100,000 does not have to be reserved. Rather, only $50,000 would have to be reserved, which is advantageous for the investor because the amount recorded as a loss reserve is reported as an expense for financial accounting purposes. Recording a more accurate loss estimate, whether higher or lower than otherwise assumed, is an important objective of investors.

The investor can also use the estimated loss and probability of loss information to determine which pool the investor should retain, which pool should be sold, or which seller should be preferred over another. For example, an investor may analyze two mortgage loans from separate pools, each having an estimated loss of $100,000, for an aggregate estimated loss to the investor of $200,000. The probability of loss, however, for the first loan may be 0 and the probability of loss for the second loan may be 50%. Thus, the aggregate estimated loss adjusted for probability for both loans is $50,000 ((0×$100,000)+(50%×$100,000)). With this information the investor understands his or her true risk, which is zero for the first loan and $50,000 for the second loan. Moreover, with the probability of loss information credit risk management techniques may be focused on the loan with a 50% probability of loss to both reduce the estimated loss and the probability of loss rather than expending credit risk management techniques on the loan with a zero probability of loss.

The probability of loss for the mortgage loan is determined, in one example, by a summation of various probability factors including a base probability. Each probability factor is intended to account for the increased, or in some cases decreased, probability of loss relating to the factor. The various probability factors are discussed hereafter. The probability of loss determination begins with a base case, which is a set of assumptions about the mortgage loan for which the probability of loss is being determined (operation 1210). The assumptions include: a current loan to value ratio ("CLTV") of between 75 and 80 (the CLTV is the current loan amount divided by the current value of the property); a prime credit mortgage loan; a mortgage loan for a property that is a primary residence; and a mortgagor that is not in bankruptcy. These base assumptions reflect some of the typical characteristics of a mortgage loan. The probability of loss for the base case is zero.

The first probability factor added to the base probability accounts for the delinquency status of the mortgage loan. Generally, the more delinquent the mortgagor is in his or her payments, then the greater the probability that the mortgage loan will eventually experience a loss. In most cases, with each additional month of delinquency, the mortgagor accrues an additional month of interest, and out-of-pocket costs such as attorney fees to initiate foreclosure may also be incurred. In order to reinstate, or bring the mortgage loan current, the mortgagor must pay all accrued costs. Thus, over time, it becomes more difficult for the mortgage loan to be brought current, and more likely that the mortgage loan will fail to cure, and go to loss. If the mortgage loan is current, then the first probability factor is set to one, which is added to the base probability (operation 1212).

Operations 1212-1226 illustrate the probability factors for various delinquency states a mortgage loan may be in. The probability associated with each delinquency state may be adjusted at any time. If the mortgage loan is 30 days delinquent, then the first probability of loss factor is set to five, which is added to the base probability (operation 1214). If the mortgage loan is 60 days delinquent, then the first probability of loss factor is set to ten, which is added to the base probability factor (operation 1216). If the mortgage loan is 90 days delinquent, then the first probability of loss factor is set to 15, which is added to the base probability (operation 1218). If the mortgage loan is in the first month of foreclosure, then the first probability of loss factor is set to 20, which is added to the base probability (operation 1220). If the mortgage loan is beyond the first month of foreclosure proceedings, then the first probability of loss factor is set to 30, which is added to the base probability (operation 1222). If the mortgage loan is REO, then the first probability of loss factor is set to 99, which is added to the base probability (operation 1224). Finally, if there has been a realized loss, then the first probability of loss factor is set to 100, which is added to the base probability (operation 1226) (the probability of loss is 100%, indicating that the loss has already occurred). In a hypothetical example, if the mortgage loan is 60 days delinquent, then an interim probability of loss is: 0 (base probability)+10 (first probability factor for 60 days delinquent)=10.

A second probability of loss factor is added to the base probability to account for the actual CLTV for the mortgage loan. Generally, the greater the CLTV ratio, then the greater the probability of a loss on the mortgage loan and that the mortgage loan will experience a default. In addition, the greater the CLTV ratio, the greater the mortgage loan amount is in proportion to the value of the property. If the CLTV for the mortgage loan is less than or equal to 50, then the second probability of loss factor is set to negative 50 (−50), which is added to the probability of loss (operation 1228). A low CLTV ratio indicates that the mortgagor could sell the property and pay off the mortgage loan with the proceeds from the sale, which would allow the mortgagor to avoid foreclosure. If the CLTV for the mortgage loan is greater than 50 and less than or equal to 75, then the second probability of loss factor is set to zero, which is added to the probability of loss (operation 1230). If the CLTV for the mortgage loan is greater than 75 and less than or equal to 100, then the second probability of loss factor is set to 10, which is added to the probability of loss (operation 1232). Finally, if the CLTV for the mortgage loan is greater than 100, then the second probability of loss factor is set to 25, which is added to the probability of loss. Referring to the hypothetical example, if the CLTV=82, then the interim probability of loss is: 0 (base probability)+10 (first probability factor for 60 days delinquent)+10 (second probability factor for 75<CLTV<100)=20.

Next, a third probability of loss factor is added to the probability of loss to account for the type of mortgage loan. If the mortgage loan is subprime, then the third probability of loss factor is set to 15, which is added to the probability of loss (operation 1236). A subprime mortgage loan is generally given to a mortgagor with some flaw in his or her credit history; accordingly, subprime mortgage loans generally have a higher probability of loss. If the mortgage loan is an alternative credit mortgage loan, then the third probability of loss factor is set to five, which is added to the probability of loss (operation 1238). An alternative credit mortgage loan is one in which the mortgagor or the property has additional risk (except a bad credit risk, which would be classified as subprime). For instance, a mortgage loan extended to someone who is self-employed is considered high risk. Finally, in operation 1240, if the mortgage loan is prime (corresponding to the base case), then the third probability factor preferably is set to zero, which is added to the probability of loss. Referring to the hypothetical, if the mortgage loan is subprime, then the interim probability of loss is: 0 (base probability)+10 (first probability factor for 60 days delinquent)+10 (second probability factor for 75<CLTV<100)+15 (third probability factor for subprime mortgage loan)=35.

After the mortgage loan type is accounted for, then a fourth probability of loss factor is added to the probability of loss to account for the type of property. If the mortgage loan is for a second home, then the fourth probability of loss factor is set to negative five (−5), which is added to the probability of loss (operation 1242). Generally, only mortgagors with substantial financial means have a second home, which indicates that their probability of loss is somewhat unlikely. If the mortgage loan is for an investment property, the fourth probability of loss factor is set to five, which is added to the probability of loss (operation 1244). Mortgagors are usually very motivated to protect their primary and second residences from foreclosure, but much more willing to give up an investment property which is merely rented to a tenant. Much of this stems from the psychological stigma of losing one's home, versus the relatively painless experience of losing money on an investment. Finally, if the mortgage loan is for a primary residence (corresponding to the base case), then the fourth probability of loss factor is set to zero, which is added to the probability of loss (operation 1246). Referring to the hypothetical, for a second home the interim probability of loss is: 0 (base probability)+10 (first probability factor for 60 days delinquent)+ 10 (second probability factor for 75<CLTV<100)+15 (third probability factor for subprime loan)−5 (fourth probability factor for second home)=30.

Referring to FIG. 12b, following accounting for the property type, a fifth probability of loss factor to account for any bankruptcy proceedings is added to the probability of loss. If the mortgagor has filed for bankruptcy, there is an increased probability of loss because bankruptcy is a clear indication of financial distress. Not only is it less likely that the mortgagor will cure the default, it is also more likely that a loss will result, as the mortgagor will be unable to properly maintain the property, which will hurt its value. If the mortgagor is in chapter 13 bankruptcy, then the fifth probability of loss factor is set to ten, which is added to the probability of loss (operation 1248). If the mortgagor has filed for bankruptcy, but the chapter is unknown, then the fifth probability of loss factor is set to 10, which is added to the probability of loss (operation 1250). The most common chapter of bankruptcy is Chapter 13, so if none is provided, then Chapter 13 is assumed. If the mortgagor has filed for bankruptcy under any chapter besides chapter 13, then the fifth probability of loss factor is set to 10, which is added to the probability of loss (operation 1252). The court proceedings for other possible bankruptcy chapters are lengthy. Finally, if the mortgagor is not in bankruptcy (corresponding to the base case), then the fifth probability of loss is set to 0, which is added to the probability of loss (operation 1254). Referring to the hypothetical, for a mortgagor not in bankruptcy the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)=30.

Next, a sixth probability of loss factor to account for three specific risk factors (documentation level, FICO score, and property issues) is added to the probability of loss. The documentation level of a mortgage loan refers to the completeness of the application and supporting documentation submitted by the mortgagor when applying for the mortgage loan. For instance, some mortgage loans are made with only a W-2 Form to prove a mortgagor's income; others verify income with tax returns, bank statements and verbal confirmation from employers. Generally, well documented mortgage loans have less risk than low documentation or no documentation loans.

"FICO" is an industry term used to refer to the most common and all but universally used credit score, developed by and named for the Fair Isaacs Company. Virtually every individual in the U.S. who has obtained any form of credit is assigned a FICO score. The score is higher when bills are paid on time and debt is repaid faster than required. Scores are lower when payments are missed. A FICO of 580 is an industry standard benchmark that indicates poor credit. Flawless credit would approach a perfect score of 800.

Property issues are circumstances related to the property. Any issue, such as uninsured damage, limited access or unused architecture, adds risk to the mortgage loan, as any issue implies that either money must be extended for repairs, or the property will be difficult to sell upon foreclosure.

If the mortgage loan is a low document mortgage loan, then the sixth probability of loss factor is set to five, which is added to the probability of loss (operation 1256). If the mortgage loan has a credit score (FICO) of less than 580, then ten is added to the sixth probability of loss factor, which is added to the probability of loss (operation 1258). If there is a property issue, such as uninsured termite damage or water damage, then 25 is added to the sixth probability of loss factor, which is added to the probability of loss. In one example, each of the three specific risk factors are considered individually; accordingly, more than one of the risk factors may apply to a mortgage loan. For example, the mortgage loan may be a low document mortgage loan and have a property issue, which would result in a sixth probability factor of 30. Finally, if there are no specific risk factors (corresponding to the base case), then the sixth probability of loss factor is set to zero, which is added to the probability of loss (operation 1262). Referring to the hypothetical, for a low document mortgage loan the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)=35.

After accounting for the specific risk factors, a seventh probability of loss factor to account for the timing of the payment loss is added to the probability of loss. An early payment default indicates a higher probability of eventual loss because it suggests that the mortgagor was ill prepared to make the mortgage loan payments. Mortgagors usually default after making several months of payments, and usually as the result of an event, such as death or unemployment. When a mortgagor defaults within the first few months of the mortgage loan, unless there was a sudden event, the reason is usually that the mortgage loan was made based on false information. If the mortgagor cannot make the payments early on, it is unlikely that the situation will improve and the mortgage loan will reinstate.

If there is a first payment loss, then the seventh probability of loss factor is set to 15, which is added to the probability of loss (operation 1264).

If there is an early payment loss, then the seventh probability of loss factor is set to five, which is added to the probability of loss (operation 1266). It is assumed that a default in the first three months on a mortgage loan, is early. Finally, if there is not an early payment default (corresponding to the base case), then the seventh probability of loss factor is set to zero, which is added to the probability of loss (operation 1268). Referring to the hypothetical, for an early payment default the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)=40.

Referring to FIG. 12c, following accounting for the risk of early payment default, an eighth probability of loss factor to account for the financing of the mortgage loan is added to the probability of loss. If the mortgage loan is a cash-out refinancing, then the eighth probability of loss factor is preferably set to five, which is added to the probability of loss (operation 1270). A cash-out financing is one in which the mortgagor takes out a new mortgage loan on an existing property that is in excess of the existing mortgage loan. The new mortgage loan is used to pay off the existing mortgage loan, and the excess is paid to the mortgagor. This is a way of taking out the equity in a property, in the form of cash. Cash-out refinancing is risky for two reasons. First, it results in a higher LTV (loan to value ratio), which, all things being the same, would bring a greater probability of loss upon sale of the property than a lower LTV loan. Second, oftentimes mortgagors take out cash because of financial stress.

If the mortgage loan is an equity refinancing, then the eighth probability of loss factor is set to two point five (2.5), which is added to the probability of loss (operation 1272). An equity refinancing occurs when a mortgagor obtains a new mortgage loan of an amount equal to the existing mortgage loan on a property. The most common reason for an equity refinancing is to obtain a more favorable interest rate. The entire amount of the new mortgage loan is applied to pay off the existing mortgage loan. An equity refinancing is a lower risk event because it usually results in a lower mortgage loan payment, which makes it easier for the mortgagor to stay current on the mortgage loan. There is some risk with an equity refinancing, however, because the resulting LTV depends upon an accurate appraisal value. It is not unusual for the appraisal in an equity refinancing to be inaccurate, which means that, should the mortgage loan default, the property will be sold for less than the appraisal value upon which the mortgage loan was based, and a loss will be more likely to result.

If the mortgage loan is a purchase money mortgage loan, then the eighth probability of loss factor is set to negative five (−5), which is added to the probability of loss (operation 1274). A purchase money mortgage loan is the least risky mortgage loan type because of two factors. First, there is no cash being taken out. Second, the most accurate indication of value of a property is the price someone will pay to own the property. A purchase money mortgage loan is used to acquire a property. The acquisition, by its nature, is a strong confirmation of value.

Finally, if the mortgage loan purpose is not known, then the eighth probability of loss factor is set to zero, which is added to the probability of loss (operation 1276). Referring to the hypothetical, for an equity refinancing the interim probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)+2.5 (eighth probability factor for equity refinancing)=42.5.

After accounting for the mortgage loan purpose, a ninth probability of loss factor to account for any exceptions in the underwriting of the mortgage loan is added to the probability of loss. Generally, underwriting exceptions indicate a higher probability of loss because they suggest that either the mortgagor should not have been qualified for the mortgage loan, or the property value was not as high as assumed when the mortgage loan was made (i.e., the true LTV is higher than stated). If there are underwriting exceptions, then the ninth probability of loss factor is preferably set to 10, which is added to the probability of loss (operation 1278). An exemplary underwriting exception is when the mortgage loan file shows, upon review, that the lender failed to verify the mortgagor's income with an independent source. This might be indicated by the verifier's surname being identical to that of the mortgagor, for example. This would suggest that the mortgagor overstated the income used as a basis for the mortgage loan, and that, in fact, the mortgagor is less able to make the mortgage loan payments than was assumed.

If there are no underwriting exceptions, then the ninth probability of loss factor is set to negative five (−5), which is added to the probability of loss (operation 1280). A mortgage loan without underwriting exceptions indicates that the mortgagor's loan application and supporting documents were reviewed, and it was found that, without exception, the lender obtained and verified all information upon which the decision to make the mortgage loan was based. A lower probability of loss than the base case is indicated because the base case assumes that all mortgage loans have some underwriting risk, a file that has been proven to have no underwriting risk is even less likely than the base case to result in loss. In the base case, the probability of loss factor for a mortgage loan is neither increased nor decreased, in other words 0 is added for underwriting exceptions (operation 1282), as it is assumed that all loans have some underwriting risk, and only those loans where the credit risk manager or servicer has performed a review and is aware of a specific risk, or has performed a review and has proven that there were no underwriting flaws for a particular loan, are adjusted for the risk or for the proof that there is no identifiable underwriting exception. Referring to the hypothetical, for a mortgage loan with underwriting exceptions the probability of loss is: 0 (base probability)+10 (first probability factor for 60 days delinquent)+10 (second probability factor for 75<CLTV<100)+15 (third probability factor for subprime loan)−5 (fourth probability factor for second home)+0 (fifth probability factor for no bankruptcy proceedings)+5 (sixth probability factor for low document loan)+5 (seventh probability factor for early payment loss)+ 2.5 (eighth probability factor for equity refinancing)+10 (ninth probability factor for underwriting exceptions)=57.5.

The summation of the above-described probability of loss factors provides the overall probability of loss for a mortgage loan according to one aspect of the present embodiment (operation 1284). Referring to the hypothetical mortgage loan, the probability of loss is 57.5. In one example if the probability of loss summation yields a result that is less than or equal to zero than the probability of loss is zero, and if the result is greater than or equal to 100, then the probability of loss is 100. The probability of loss indicates the likelihood that a loss will ultimately result from the mortgage loan. In the hypothetical, there is a 57.5% likelihood that a loss will result (and a 42.5% chance that a loss will not result). An exemplary loss reserve for a loss estimate of $100,000, and the probability of loss of 57.5%, is $57,500. The various values for the probability factors may be adjusted for various reasons including statistical evidence, and anecdotal evidence.

Alternative configurations of the invention are envisioned. For example, software code embodying aspects of the invention may reside on the servicer or reside on a plurality of computing devices in a distributed manner. The invention can also be embodied as computer readable code on a computer readable medium. The computer readable medium being any storage device that can store data which can thereafter be read by a computer system. Examples of the computer readable medium include a read only memory, a random access memory, a storage area network, a memory stick, magnetic data storage devices such as diskettes, and optical storage devices such as CD-ROMS. The computer readable medium can also be distributed over a network coupled computer system so that the computer readable code is stored and executed in a distributed fashion. The computer readable code may also be distributed using a propagated signal receivable by the computer system and executable therein. The computer readable code may be written in any suitable programming language, and for any suitable computing platform. Some implementations of the present invention may be compiled into a platform-independent format, such as Java™ byte codes, or other formats that can be generated by standard development tools as are well known in the art.

While the methods disclosed herein have been described and shown with reference to particular operations performed in a particular order, it will be understood that these operations may be combined, sub-divided, or re-ordered to form an equivalent method without departing from the teachings of the present invention. Accordingly, unless specifically indicated herein, the order and grouping of the operations is not a limitation of the present invention.

While various embodiments of the invention have been particularly shown and described, it will be understood by those skilled in the art that various other changes in the form and details may be made without departing from the spirit and scope of the invention, which is defined by the following claims.

What is claimed is:

1. A computer system for determining a probability of loss for a loan comprising:
    a computer in communication with a database storing data for the loan, the computer configured to:
    assign a base probability of loss factor to the loan, the base probability of loss factor for a loan with base characteristics including a loan to value ratio of between 75 and 80, a loan for a primary residence, a prime credit loan, and a loan not associated with a bankruptcy proceeding;
    search the database to obtain at least one characteristic of the loan different from the base characteristics;
    based on the at least one characteristic of the loan different from the base characteristics, obtain at least one loss probability factor associated with the loan, wherein the at least one loss probability factor accounts for the at least one characteristic of the loan; and
    sum the at least one loss probability factor with the base probability of loss factor, wherein the summation yields the probability of loss for the loan.

2. The computer system of claim 1 wherein the at least one characteristic of the loan includes a delinquency status of the loan; and
    wherein the computer is configured to search the database to obtain a first probability factor to account for the delinquency status of the loan, wherein the first probability factor is one of the at least one loss probability factors.

3. The computer system of claim 2 wherein the delinquency status of the loan includes current, 30 days delinquent, 60 days delinquent, 90 days delinquent, first month of foreclosure proceedings, more than one month after the start of foreclosure proceedings, real estate owned, and realized loss; and
    wherein the computer is further configured to:
    set the first probability factor to one if the delinquency status of the loan is current;
    set the first probability factor to five if the delinquency status of the loan is 30 days delinquent;
    set the first probability factor to 10 if the delinquency status of the loan is 60 days delinquent;
    set the first probability factor to 15 if the delinquency status of the loan is 90 days delinquent;
    set the first probability factor to 20 if the delinquency status of the loan is in the first month of foreclosure proceedings;
    set the first probability factor to 30 if the delinquency status of the loan is more than one month after the start of foreclosure proceedings;
    set the first probability factor to 99 if the delinquency status of the loan is real estate owned; and
    set the first probability factor to 100 if the delinquency status of the loan is a realized loss.

4. The computer system of claim 1 wherein the at least one characteristic of the loan includes a current loan to value ratio for the loan; and
    wherein the computer is configured to obtain a second probability factor to account for the current loan to value ratio for the loan.

5. The computer system of claim 4 wherein the computer is configured to:
set the second probability factor to −50 if the current loan to value ratio for the loan is less than 50;
set the second probability factor to zero if the current loan to value ratio for the loan is between 50 and 75;
set the second probability factor to 10 if the current loan to value ratio for the loan is between 75 and 100; and
set the second probability factor to 25 if the current loan to value ratio for the loan is greater than 100.

6. The computer system of claim 1 wherein the at least one characteristic of the loan includes a loan type, and wherein the computer is configured to obtain a third probability factor to account for the loan type.

7. The computer system of claim 6 wherein the computer is configured to:
set the third probability factor to 15 if the loan type is a subprime loan; and
set the third probability factor to 5 if the loan type is an alternative credit loan.

8. The computer system of claim 1 wherein the at least one characteristic of the loan includes a type of property, and wherein the computer is configured to obtain a fourth probability factor to account for the type of property.

9. The computer system of claim 8 wherein the computer is configured to:
set the fourth probability factor to negative five if the type of property is a second home; and
set the fourth probability factor to five if the type of property is an investment property.

10. The computer system of claim 1 wherein the at least one characteristic of the loan includes a bankruptcy proceeding; and
computer is configured to obtain a fifth probability factor to account for the bankruptcy proceeding.

11. The computer system of claim 10 wherein the computer is configured to:
set the fifth probability factor to ten if the bankruptcy proceeding is a chapter thirteen bankruptcy proceeding.

12. The computer system of claim 1 wherein the at least one characteristic of the loan includes a low document loan, a FICO loan, and a property issue, and wherein the computer is configured to:
set the sixth probability factor to five for the low document loan;
set the sixth probability factor to ten for the FICO loan; and
set the sixth probability factor to 25 for the property issue.

13. The computer system of claim 1 wherein the at least one characteristic of the loan includes an early payment default; and
wherein the computer is configured to obtain a seventh probability factor to account for the early payment default.

14. The computer system of claim 13 wherein the early payment default includes a first payment default, a payment default within the first three payments on a loan wherein the computer is configured to:
set the seventh probability factor to 15 for the first payment default; and
set the seventh probability factor to five for the payment default within the first three payments on a loan.

15. The computer system of claim 1 wherein the computer is configured to obtain an eighth probability factor to account for the financing of the loan.

16. The computer system of claim 15 wherein the financing of the loan includes a cash-out refinancing, an equity refinancing, and a purchase money loan; and wherein the computer is configured to:
set the eighth probability factor to five for the cash-out refinancing;
set the eighth probability factor to 2.5 for the equity refinancing; and
set the eighth probability factor to negative five for the purchase money loan.

17. The computer system of claim 1 wherein the at least one characteristic of the loan includes an exception in the underwriting process, and wherein the computer is configured to obtain a ninth probability factor to account for the exception in the underwriting process.

18. The computer system of claim 17 wherein the computer is configured to:
set the ninth probability factor to ten if there are underwriting exceptions; and
set the ninth probability factor to negative five if there are no underwriting exceptions.

* * * * *